US012458426B2

(12) United States Patent
Hancock et al.

(10) Patent No.: US 12,458,426 B2
(45) Date of Patent: Nov. 4, 2025

(54) ELECTROSURGICAL INSTRUMENT

(71) Applicant: CREO MEDICAL LIMITED, Chepstow (GB)

(72) Inventors: Christopher Paul Hancock, Bath (GB); Patrick Burn, Chepstow (GB); Pallav Shah, Chepstow (GB)

(73) Assignee: CREO MEDICAL LIMITED, Chepstow (GB)

( * ) Notice: Subject to any disclaimer, the term of this patent is extended or adjusted under 35 U.S.C. 154(b) by 1419 days.

(21) Appl. No.: 16/982,396

(22) PCT Filed: Jun. 27, 2019

(86) PCT No.: PCT/EP2019/067166
§ 371 (c)(1),
(2) Date: Sep. 18, 2020

(87) PCT Pub. No.: WO2020/011546
PCT Pub. Date: Jan. 16, 2020

(65) Prior Publication Data
US 2021/0052317 A1    Feb. 25, 2021

(30) Foreign Application Priority Data

Jul. 12, 2018 (GB) .................................... 1811434

(51) Int. Cl.
*A61B 18/12* (2006.01)
*A61B 18/00* (2006.01)
(Continued)

(52) U.S. Cl.
CPC .......... *A61B 18/1206* (2013.01); *A61B 18/14* (2013.01); *A61B 18/1815* (2013.01);
(Continued)

(58) Field of Classification Search
CPC ........... A61B 2018/00077; A61B 2018/00083; A61B 2018/00541; A61B 2018/00577;
(Continued)

(56) References Cited

U.S. PATENT DOCUMENTS 5,295,955 A    3/1994   Rosen et al.
5,974,343 A    10/1999  Brevard et al.
(Continued)

FOREIGN PATENT DOCUMENTS

AU    2015264779 A1    12/2015
CN    102711648 A      10/2012
(Continued)

OTHER PUBLICATIONS

International Preliminary Report on Patentability issued from the International Preliminary Examining Authority in counterpart International Application No. PCT/EP2019/067166, mailed on Jul. 17, 2020.
(Continued)

*Primary Examiner* — Linda C Dvorak
*Assistant Examiner* — Bradford C. Blaise
(74) *Attorney, Agent, or Firm* — ArentFox Schiff LLP

(57) ABSTRACT

An electrosurgical instrument having a radiating tip with enhanced flexibility. In a first aspect, this is achieved by shaping the dielectric material in the radiating tip to facilitate bending of the radiating tip. In a second aspect, this is achieved by forming a dielectric body and outer sheath of the radiating tip as separate parts, to enable movement and flexure between the parts. By improving the flexibility of the radiating tip, manoeuvrability of the electrosurgical instrument may be improved.

19 Claims, 10 Drawing Sheets

(51) Int. Cl.
*A61B 18/14* (2006.01)
*A61B 18/18* (2006.01)

(52) U.S. Cl.
CPC ............... *A61B 2018/00077* (2013.01); *A61B 2018/00083* (2013.01); *A61B 2018/00541* (2013.01); *A61B 2018/00577* (2013.01); *A61B 2018/00601* (2013.01); *A61B 2018/1823* (2013.01); *A61B 2018/1838* (2013.01); *A61B 2018/1861* (2013.01); *A61B 2018/1892* (2013.01)

(58) Field of Classification Search
CPC ........... A61B 2018/00601; A61B 2018/00982; A61B 2018/126; A61B 2018/1467; A61B 2018/1823; A61B 2018/183; A61B 2018/1838; A61B 2018/1846; A61B 2018/1853; A61B 2018/1861; A61B 2018/1884; A61B 2018/1892; A61B 18/1206; A61B 18/14; A61B 18/18; A61B 18/1815

See application file for complete search history.

(56) References Cited

U.S. PATENT DOCUMENTS

| | | | |
|---|---|---|---|
| 9,636,176 B2 | 5/2017 | Hancock et al. | |
| 2007/0043346 A1* | 2/2007 | Cronin | A61B 18/18 607/101 |
| 2008/0071259 A1 | 3/2008 | Gauthier et al. | |
| 2009/0005766 A1* | 1/2009 | Brannan | A61B 18/1815 606/10 |
| 2009/0222002 A1* | 9/2009 | Bonn | A61B 18/1815 606/33 |
| 2009/0295674 A1* | 12/2009 | Bonn | A61B 18/18 343/872 |
| 2011/0213352 A1* | 9/2011 | Lee | A61B 18/1815 606/33 |
| 2012/0203217 A1* | 8/2012 | Brannan | A61B 18/1815 606/33 |
| 2013/0281851 A1 | 10/2013 | Carr | |
| 2015/0133908 A1* | 5/2015 | Brannan | A61B 18/18 606/33 |
| 2016/0151113 A1 | 6/2016 | Kim et al. | |
| 2016/0262832 A1 | 9/2016 | Cronin et al. | |
| 2017/0265940 A1* | 9/2017 | Prakash | A61B 17/00234 |
| 2020/0022689 A1* | 1/2020 | Seedhom | A61M 25/0012 |

FOREIGN PATENT DOCUMENTS

| | | |
|---|---|---|
| CN | 203536579 U | 4/2014 |
| CN | 107148247 A | 9/2017 |
| EP | 2 484 303 A1 | 8/2012 |
| EP | 3089689 B1 | 5/2018 |
| GB | 2551339 A | 12/2017 |
| WO | 2006/084676 A1 | 8/2006 |
| WO | 2011/066445 A2 | 6/2011 |
| WO | WO2017/103209 A1 | 6/2017 |

OTHER PUBLICATIONS

International Search Report and Written Opinion, issued by International Searching Authority in corresponding International Application No. PCT/EP2019/067166, mailed on Dec. 4, 2019.

Search Report under Section 17(5), issued by the United Kingdom Intellectual Property Office in counterpart United Kingdom Application No. GB1811434.8, dated Dec. 21, 2018.

Search Report under Section 17(6), relating to claims 11-17, issued by the United Kingdom Intellectual Property Office in counterpart United Kingdom Application No. GB1811434.8, dated Feb. 21, 2019.

Search Report under Section 17(6), relating to claims 18-21, issued by the United Kingdom Intellectual Property Office in counterpart United Kingdom Application No. GB1811434.8, dated Feb. 21, 2019.

Written Opinion of the International Preliminary Examining Authority, issued by the International Preliminary Examining Authority in corresponding International Application No. PCT/EP2019/067166, mailed on Jun. 4, 2020.

* cited by examiner

ELECTROSURGICAL INSTRUMENT

CROSS-REFERENCE TO RELATED APPLICATIONS

This application is a National Stage entry of International Application No. PCT/EP2019/067166, filed on Jun. 27, 2019, which claims priority to British Patent Application No. 1811434.8, filed on Jul. 12, 2018. The disclosures of the priority applications are hereby incorporated in their entirety by reference.

FIELD OF THE INVENTION

The invention relates to an electrosurgical instrument for delivering microwave energy and/or radiofrequency energy to biological tissue in order to ablate the target tissue. The probe may be inserted through a channel of an endoscope or catheter, or may be used in laparoscopic surgery or open surgery. The instrument may be used in pulmonary or gastrointestinal applications, but is not limited to such.

BACKGROUND TO THE INVENTION

Electromagnetic (EM) energy, and in particular microwave and radiofrequency (RF) energy, has been found to be useful in electrosurgical operations, for its ability to cut, coagulate, and ablate body tissue. Typically, apparatus for delivering EM energy to body tissue includes a generator comprising a source of EM energy, and an electrosurgical instrument connected to the generator, for delivering the energy to tissue. Conventional electrosurgical instruments are often designed to be inserted percutaneously into the patient's body. However, it can be difficult to locate the instrument percutaneously in the body, for example if the target site is in a moving lung or a thin walled section of the gastrointestinal (GI) tract. Other electrosurgical instruments can be delivered to a target site by a surgical scoping device (e.g. an endoscope) which can be run through channels in the body such as airways or the lumen of the oesophagus or colon. This allows for minimally invasive treatments, which can reduce the mortality rate of patients and reduce intraoperative and postoperative complication rates.

Tissue ablation using microwave EM energy is based on the fact that biological tissue is largely composed of water. Human soft organ tissue is typically between 70% and 80% water content. Water molecules have a permanent electric dipole moment, meaning that a charge imbalance exists across the molecule. This charge imbalance causes the molecules to move in response to the forces generated by application of a time varying electric field as the molecules rotate to align their electric dipole moment with the polarity of the applied field. At microwave frequencies, rapid molecular oscillations result in frictional heating and consequential dissipation of the field energy in the form of heat. This is known as dielectric heating.

This principle is harnessed in microwave ablation therapies, where water molecules in target tissue are rapidly heated by application of a localised electromagnetic field at microwave frequencies, resulting in tissue coagulation and cell death. It is known to use microwave emitting probes to treat various conditions in the lungs and other organs. For example, in the lungs, microwave radiation can be used to treat asthma and ablate tumours or lesions.

RF EM energy can be used for cutting and/or coagulation of biological tissue. The method of cutting using RF energy operates based on the principle that as an electric current passes through a tissue matrix (aided by the ionic contents of the cells, i.e. sodium and potassium), the impedance to the flow of electrons across the tissue generates heat. When a pure sine wave is applied to the tissue matrix, enough heat is generated within the cells to vaporise the water content of the tissue. There is thus a large rise in the internal pressure of the cell that cannot be controlled by the cell membrane, resulting in the cell rupturing. When this occurs over a wide area it can be seen that tissue has been transected.

RF coagulation operates by applying a less efficient waveform to the tissue, whereby instead of being vaporised, the cell contents are heated to around 65° C. This dries out the tissue by desiccation and also denatures the proteins in the walls of vessels and the collagen that makes up the cell wall. Denaturing the proteins acts as a stimulus to a coagulation cascade, so clotting is enhanced. At the same time, collagen in the cell wall is denatured from a rod like molecule to a coil, which causes the vessel to contract and reduce in size, giving the clot an anchor point, and a smaller area to plug.

SUMMARY OF THE INVENTION

At its most general, the invention provides an electrosurgical instrument having a radiating tip with enhanced flexibility. In a first aspect of the invention, this can be achieved by shaping the dielectric material in the radiating tip to facilitate bending of the radiating tip. In a second aspect of the invention, this is achieved by forming a dielectric body and outer sheath of the radiating tip as separate parts, to enable movement and flexure between the parts. By improving the flexibility of the radiating tip, manoeuvrability of the electrosurgical instrument may be improved.

The electrosurgical instrument of the invention may be used to ablate target tissue in the body. In order to efficiently ablate target tissue, the radiating tip should be located as close as possible (and in many cases inside) the target tissue. In order to reach the target tissue (e.g. in the lungs), the device may need to be guided through passageways (e.g. airways) and around obstacles in the body. Thus, making the radiating tip more flexible may facilitate guiding the radiating tip to target tissue. For example, where the target tissue is in the lungs, this may facilitate steering the instrument along passageways such as bronchioles, which can be narrow and winding. By locating the radiating tip as close as possible to the target tissue, irradiation of surrounding healthy tissue may be avoided or reduced.

According to a first aspect of the invention, there is provided an electrosurgical instrument comprising: a coaxial feed cable for conveying microwave energy and/or radiofrequency energy, the coaxial feed cable having an inner conductor, an outer conductor, and a dielectric material separating the inner conductor and the outer conductor; and a radiating tip disposed at a distal end of the coaxial feed cable to receive the microwave energy and/or the radiofrequency energy, the radiating tip comprising: an energy delivery structure configured to delivery the microwave energy and/or the radiofrequency energy received from the coaxial feed cable from an outer surface of the radiating tip, wherein the energy delivery structure comprises an elongate conductor electrically connected to the inner conductor and extending in a longitudinal direction beyond the distal end of the coaxial feed cable; and a dielectric body disposed around the elongate conductor, wherein the dielectric body comprises a cavity therein, the cavity being disposed adjacent the elongate conductor to facilitate flexure of the radiating tip.

The energy delivery structure may be configured to deliver microwave energy only, or radiofrequency energy only. And in embodiments, the energy delivery structure may be configured to be capable of delivery both microwave and radiofrequency energy, separately or simultaneously. The elongate conductor may be configured as an antenna for radiating microwave energy, or as a means of providing electrical connection to an active electrode for delivering radiofrequency energy (e.g. in combination with a return electrode connected to the outer conductor).

The electrosurgical instrument may be suitable for ablating tissue, especially in confined or difficult-to-access locations in the human body, such as the lungs or uterus. However, it may be understood that the instrument can be used to ablate tissue in other organs.

The coaxial feed cable may be a conventional low loss coaxial cable that is connectable at one end to an electrosurgical generator. In particular, the inner conductor may be an elongate conductor extending along a longitudinal axis of the coaxial feed cable. The dielectric material may be disposed around the inner conductor, e.g. the first dielectric material may have a channel through which the inner conductor extends. The outer conductor may be a sleeve made of conductive material that is disposed on the surface of the dielectric material. The coaxial feed cable may further include an outer protective sheath for insulating and protecting the cable. In some examples, the protective sheath may be made of or coated with a non-stick material to prevent tissue from sticking to the cable. The radiating tip is located at the distal end of the coaxial feed cable, and serves to deliver EM energy conveyed along the coaxial feed cable into target tissue. The radiating tip may be permanently attached to the coaxial feed cable, or it may be removably attached to the coaxial feed cable. For example, a connector may be provided at the distal end of the coaxial feed cable, which is arranged to receive the radiating tip and form the required electrical connections.

The dielectric body may comprise a channel for conveying the elongate conductor. The instrument may be assembled by feeding the elongate conductor through the channel or by depositing the dielectric body on the elongate conductor.

The dielectric body may be generally cylindrical, although other shapes are also possible. The dielectric body may be attached to the distal end of the coaxial feed cable. In some examples, the dielectric body may comprise a protruding portion of the dielectric material of the coaxial feed cable that extends beyond the distal end of the coaxial feed cable. This may simplify construction of the radiating tip, and avoid reflections of EM energy at the boundary between the radiating tip and the coaxial feed cable. In other examples, a second dielectric material, separate from the dielectric material of the coaxial feed cable may be used to form the dielectric body. The second dielectric material may be the same as, or different from, the dielectric material of the coaxial feed cable. The second dielectric material may be selected to improve impedance matching with target tissue in order to improve the efficiency with which the microwave energy is delivered into target tissue. The dielectric body may also include multiple different pieces of dielectric material, which are selected and arranged to shape the radiation profile in a desired manner. The dielectric body may be made of, or coated with a non-stick material (e.g. PTFE) to prevent tissue from sticking to it.

The dielectric body extends in a longitudinal direction, i.e. in a direction parallel to the longitudinal axis of the coaxial feed cable. The elongate conductor extends within a channel in the dielectric body. The channel may be a passageway extending through a portion of the dielectric body. The elongate conductor may be any suitable conductor having an elongate shape. For example, the elongate conductor may be a wire, rod or strip of conductive material that extends within the dielectric body. In some embodiments, the elongate conductor may be a distal portion of the inner conductor that extends beyond the distal end of the coaxial feed cable. In other words, the inner conductor may extend beyond the distal end of the coaxial feed cable and into the dielectric body to form the elongate conductor. This may facilitate forming the radiating tip at the distal end of the coaxial feed cable, as it avoids having to connect a separate conductor to the distal end of the inner conductor.

The radiating tip may be configured to act as a microwave radiator, i.e. it may be configured to radiate microwave energy conveyed by the coaxial feed cable. In particular, microwave energy conveyed to the radiating tip from the coaxial feed cable may be radiated along the length of the elongate conductor. The outer conductor may terminate at the distal end of the coaxial feed cable, such that the elongate conductor extends beyond a distal end of the outer conductor. In this manner, the radiating tip may act as a microwave monopole antenna. Thus, microwave energy conveyed to the radiating tip may be radiated from the elongate conductor into surrounding target tissue.

Additionally or alternatively, the radiating tip may be configured to cut or ablate target tissue using RF energy. For example, the radiating tip may include a pair of exposed electrodes (e.g. bipolar RF electrodes) which are arranged to cut or ablate target tissue. One of the electrodes may be electrically connected to the inner conductor (e.g. via the elongate conductor), and another of the electrodes may be electrically connected to the outer conductor. In this manner, by conveying radiofrequency energy to the proximal and distal electrodes, biological tissue that is located between or around the electrodes may be cut and/or ablated. In some cases, the radiating tip may be configured to deliver both microwave and RF energy, either separately or simultaneously. This may enable a rapid change in functionality of the electrosurgical instrument, by switching between or varying the application of RF and microwave energy.

The cavity may be formed in a portion of the dielectric body that is disposed around the elongate conductor, i.e. the cavity may be located in the portion of the dielectric body that has a channel through which the elongate conductor extends. The cavity may be spaced from the channel in a lateral (e.g. radial) direction, which is normal to the longitudinal direction. For example, where the dielectric body is cylindrical, the channel may be substantially centred on the central axis of the cylindrical body, and the cavity may be radially spaced from the channel. The cavity may be a void formed within, or on a surface of, the dielectric body, e.g. a region where the dielectric material of the dielectric body is absent. For example, the cavity may be a depression or an indentation on a surface of the dielectric body. The cavity may be formed in an outer surface of the dielectric body. Alternatively, the cavity may be formed in an inner surface of the dielectric body, e.g. in a wall of the channel. Where the cavity is formed within the dielectric body, the cavity may be a void or pocket enclosed within the dielectric body.

The cavity may reduce the amount of material in the portion of the dielectric body surrounding the elongate conductor. For example, the cavity may reduce a total thickness in the lateral direction of the material forming the dielectric body in the portion of the dielectric body surrounding the elongate conductor. This may reduce the stiffness of the dielectric body around the elongate conductor. The cavity may also act as a bending point or flexure which facilitates bending of the dielectric body. The cavity may therefore serve to increase the flexibility of the dielectric body. This may facilitate bending of the radiating tip, which may in turn facilitate guiding the electrosurgical instrument through narrow and winding passageways in the body. This may enable the radiating tip to be positioned as close as possible to target tissue, to ensure efficient delivery of energy to the target tissue. A volume of the cavity may be relatively small compared to the overall volume of the dielectric material. In this manner, the cavity may improve flexibility of the dielectric body, without significantly affecting the impedance matching properties of the dielectric body. Thus, the radiation profile of the radiating tip may not be significantly affected by the presence of the cavity.

The cavity may be empty (e.g. it may be filled with air). In some cases, the cavity may be filled with a deformable material for improving the flexibility of the dielectric body.

In some cases, multiple cavities may be formed in the dielectric body. The cavities may be arranged along the length of the dielectric body, e.g. they may be longitudinally spaced. This may provide multiple bending points along the length of the dielectric body, to facilitate bending of the dielectric body along its length. The cavities may also be arranged around the longitudinal axis of the dielectric body. This may facilitate bending of the dielectric body in different directions relative to the longitudinal direction. Thus, having multiple cavities may further improve the flexibility of the dielectric body. The multiple cavities may be evenly spaced, or they may be arranged in an arbitrary manner. The cavities may be placed on the dielectric body to facilitate bending of the dielectric body in a particular direction. For example, placing a cavity on a side of the dielectric body may facilitate bending the dielectric body towards that side, e.g. by reducing the stiffness of the dielectric body on the side with the cavity. Multiple cavities may be arranged around the longitudinal axis of the dielectric body, to facilitate bending of the dielectric body in multiple directions.

The cavity (or cavities) may be formed during manufacture of the dielectric body. For example, the dielectric body may be moulded to include one or more cavities. Alternatively, the cavities may be formed by drilling holes into the dielectric body and/or machining away parts of the dielectric body.

In some embodiments, the cavity may be formed by a lumen extending longitudinally in the dielectric body. The dielectric body may comprise an inner sleeve surrounding the elongate conductor (i.e. providing a channel through which the elongate conductor extends). The lumen may be spaced from the elongate conductor by a radial thickness of the inner sleeve. The lumen may extend along all or a portion of the dielectric body, to improve the flexibility of the dielectric body. The lumen may be a passage or channel extending through a portion of the dielectric body. The lumen may be a closed lumen, i.e. it may formed inside the dielectric body. Alternatively, the lumen may be an open lumen, i.e. it may be formed at a surface of the dielectric body. In some examples, the lumen may be parallel to the channel in the dielectric body. In other examples, the lumen may have a helical shape such that it winds around the channel in the dielectric body. The lumen may have a circular cross-section, or it may have a cross-section of another shape. Advantageously, the lumen may be used for conveying wiring or other inputs through the radiating tip. The lumen in the dielectric body may be continuous with a lumen in the coaxial feed cable, so that an input can be fed from the proximal end of the electrosurgical instrument to the radiating tip. For example, the lumen may be used for conveying a fluid (e.g. a coolant fluid for cooling the tip). The lumen may be used for conveying a control wire (e.g. to control a blade or other mechanism located at a distal end of the radiating tip).

There may be multiple lumens extending longitudinally in the dielectric body (e.g. where there are multiple cavities). The lumens may be arranged so that they are spaced around the channel in the dielectric body, e.g. they may be evenly spaced around the channel. This may facilitate bending of the radiating tip relative to the longitudinal axis in multiple directions.

In some embodiments the lumen may have an annular cross-section which encircles a portion of the dielectric body in which the channel is formed. In other words, the dielectric body may include an inner portion, in which the channel containing the elongate conductor is formed, and an outer portion which forms a sleeve around the inner portion. The outer portion may be spaced from the inner portion, to form the lumen between the inner portion and the outer portion. The outer portion may, for example, be spaced from the inner portion using a spacer. By providing a lumen with an annular cross-section that encircles the inner portion of the dielectric body, the cavity may effectively be formed around the longitudinal axis of the dielectric body. This may result in the stiffness of the dielectric body being substantially symmetrical about the longitudinal axis, which may facilitate bending of the dielectric body relative to the longitudinal axis, e.g. there may be no preferential bending direction. The lumen may be arranged such that its annular cross-section is substantially centred on the longitudinal axis of the dielectric body, so that the lumen is axially symmetrical about the longitudinal axis. This may further improve the isotropy of the stiffness of the dielectric body about the longitudinal axis.

In some embodiments, the lumen may be disposed at an outer surface of the dielectric body. For example, it may form a longitudinally extending groove on the outer surface of the dielectric body. The lumen may thus be an open lumen on the outer surface of the dielectric body. Where the dielectric body includes multiple cavities, multiple grooves may be formed on the outer surface. In addition to facilitating bending of the radiating tip, the grooves may serve as engagement features. For example, an outer protective sheath of the electrosurgical instrument may have one or more protrusions that are engaged in the grooves, to secure the outer protective sheath relative to the radiating tip. In another example, the grooves may be used to guide the radiating tip along the instrument channel of a surgical scoping device and/or maintain a desired orientation of the radiating tip. The grooves on the surface of the dielectric body may also be used to grip the radiating tip, e.g. to rotate the radiating tip.

In some embodiments, the cavity may be formed by an indentation in the dielectric body. The indentation may be formed in a surface of the dielectric body. The indentation may be a depression or a notch formed in a surface of the dielectric body. The indentation may act as a bending point or flexure for the dielectric body, e.g. it may constitute a region having a reduced resistance to bending compared to other regions of the dielectric body (e.g. due to the reduced thickness of the dielectric body at the indentation). A length of the indentation may be normal to the longitudinal direction, to facilitate bending of the dielectric body relative to the longitudinal direction. Multiple indentations may be formed in the dielectric body, to provide multiple bending points or flexures. In this manner, bending of the dielectric body may be facilitated at multiple points along its length.

In some embodiments, the indentation may be formed in an outer surface of the dielectric body. In other embodiments, the indentation may be formed in an inner surface of the dielectric body, e.g. in a wall of the channel in the dielectric body. Where there are multiple indentations, some of the indentations may be formed in the outer surface, whilst some of the indentations may be formed in the inner surface.

In some embodiments, the indentation may form a groove extending around a circumference of the dielectric body. The groove may be formed in the outer surface of the dielectric body. The groove may form a loop or ring around the circumference of the dielectric body. In this case, the groove may be oriented in a direction normal to the longitudinal direction. In other cases, the groove may have a helical shape such that it winds around the dielectric body along a length of the dielectric body. By forming the groove around the circumference of the dielectric body, the stiffness of the dielectric body may be substantially symmetrical about the longitudinal axis. This may facilitate bending the dielectric body relative to the longitudinal axis.

In some embodiments, the dielectric body may include a corrugated surface, and the indentation may be formed by corrugations in the corrugated surface. The outer surface of the dielectric body may be corrugated, and/or the inner surface (wall of the channel) may be corrugated. In some cases, both the outer and inner surfaces of the dielectric body may be corrugated. For example, a portion of the dielectric body may be formed by a length of corrugated tubing or pipe. Suitable corrugated tubing or pipes may be made of PTFE, FEP or PFA. The corrugated surface may include a series of corrugations or ridges which are arranged to form a sequence of peaks and troughs. The indentation may correspond to a trough formed between adjacent corrugations/ridges. As the corrugated surface may include multiple corrugations, multiple indentations may be formed in the corrugated surface. The indentations may serve as bend points or flexures for the dielectric body, as discussed above. Corrugated tubing is widely available commercially. This may facilitate production of a flexible radiating tip at a low cost.

In some embodiments, the radiating tip may further include an outer sheath disposed around an outer surface of the dielectric body, the outer sheath being separate from the dielectric body to allow relative movement between the outer sheath and the dielectric body. The outer sheath may serve to protect and isolate the radiating tip from the environment. The outer sheath may be made of, or coated with, a non-stick material (e.g. PTFE) to prevent tissue from sticking to it. The outer sheath may be a sleeve of insulating material that covers the outer surface of the dielectric body. For example, the outer sheath may be formed by a length of heat shrink tubing that was shrunk around the dielectric body. The outer sheath is separate from the dielectric body, meaning that it is formed separately from the dielectric body, i.e. they are formed as separate components. Furthermore, there may be no adhesive or other connection means securing the outer sheath to the dielectric body. The outer sheath may be held on the dielectric body via frictional forces between the outer sheath and the dielectric body. As a result, a small amount of relative movement between the outer surface of the dielectric body and the outer sheath may be possible. In this manner, when the dielectric body is bent, the outer sheath may move relative to the surface of the dielectric body, to avoid build-up of stresses in the outer sheath.

For example, the outer sheath may "bunch up" around an inside of a bend in the dielectric body. Thus, the outer sheath may not provide any significant resistance to bending of the radiating tip, i.e. the outer sheath may not significantly increase the stiffness of the radiating tip. Forming the outer sheath separately from the dielectric body may therefore facilitate bending of the radiating tip. Additionally, this may avoid concentrations of stress at an interface between the dielectric body and the outer sheath, which could cause breaks in the dielectric body and/or tears in the outer sheath.

The outer sheath may be attached at one end to the distal end of the coaxial feed cable, to fix its position relative to the coaxial feed cable. For example, the outer sheath may be attached to the protective sheath of the coaxial feed cable. In some cases, the outer sheath may be a continuation of the protective sheath of the coaxial feed cable, e.g. the outer sheath may be a distal portion of the protective sheath of the coaxial feed cable that extends beyond the distal end of the coaxial feed cable. Where the cavity is formed on the outer surface of the dielectric body, the outer sheath may serve to cover the cavity. In this manner, the radiating tip may have a smooth outer surface, despite the presence of cavities in the dielectric body.

The configuration of the outer sheath may provide an independent aspect of the invention. According to this aspect, there is provided an electrosurgical instrument comprising: a coaxial feed cable for conveying microwave energy and/or radiofrequency energy, the coaxial feed cable having an inner conductor, an outer conductor, and a dielectric material separating the inner conductor and the outer conductor; and a radiating tip disposed at a distal end of the coaxial feed cable to receive the microwave energy and/or the radiofrequency energy, the radiating tip comprising: an energy delivery structure configured to delivery the microwave energy and/or the radiofrequency energy received from the coaxial feed cable from an outer surface of the radiating tip, wherein the energy delivery structure comprises an elongate conductor electrically connected to the inner conductor and extending in a longitudinal direction beyond the distal end of the coaxial feed cable; and a dielectric body disposed around the elongate conductor; and an outer sheath disposed around an outer surface of the dielectric body, wherein the outer sheath is separate from the dielectric body to allow relative movement between the outer sheath and the dielectric body.

Features of the first aspect of the invention may be shared with the second aspect of the invention, and are not discussed again. In particular, the dielectric body of the electrosurgical instrument of the second aspect of the invention may include a cavity (or multiple cavities), as discussed above in relation to the first aspect of the invention.

Embodiments of either the first or second aspects of the invention set out above may comprise the following features.

In some embodiments, the dielectric body may be formed of a first dielectric material, and the outer sheath may be formed of a second dielectric material different from the first dielectric material. The first and second dielectric materials may be selected to improve impedance matching of the radiating tip with target tissue. The first and second dielectric materials may also be selected to facilitate bending of the radiating tip. For example, the second dielectric material may have a lower stiffness than the first dielectric material. This may ensure that the outer sheath does not significantly increase the overall stiffness of the radiating tip.

In some embodiments, the first dielectric material may have a higher melting temperature than the second dielectric material. This may enable the outer sheath to be formed by melting or shrinking the second dielectric material over the dielectric body. For example, the outer sheath may be formed by a tube of heat shrink material made of the second dielectric material. The heat shrink tube may be placed over the dielectric body and then shrunk over the dielectric body by applying heat. Because the melting temperature of the first dielectric material is higher than the melting temperature of the second dielectric material, the dielectric body does not melt when the outer sheath is formed over it. This may ensure a good fit of the outer sheath over the dielectric body, whilst keeping them as separate components to enable relative movement between them. This may facilitate manufacture of the radiating tip.

In some embodiments, the first dielectric material may be polytetrafluoroethylene (PTFE) and the second dielectric material may be fluorinated ethylene propylene (FEP). PTFE has a higher melting temperature than FEP. FEP is generally softer than PTFE, so may be easily bendable. Using this combination of materials, the outer sheath may be formed by melting FEP over the dielectric body (e.g. using a mould), to form the outer sheath directly on the dielectric body. Alternatively, a length of heat shrink tubing made of FEP may be used to form the outer sheath over the dielectric body.

In some embodiments, the outer sheath may include a distal tip arranged to cover a distal end of the dielectric body. Thus, the outer sheath may cover both the outer surface (e.g. sides) and distal end of the dielectric body. In this manner, the outer sheath may form a cap over the dielectric body. The distal tip may be made of the same dielectric material as the rest of the outer sheath (e.g. the second dielectric material). The distal tip may be pointed, to facilitate insertion of the radiating tip into target tissue. Alternatively, the distal tip may be rounded or flat. The distal tip may serve to improve impedance matching with target tissue. The distal tip may also serve to prevent fluid located in the environment around the radiating tip from entering a space (e.g. cavity) between the outer sheath and the dielectric body.

In some embodiments, the outer sheath may be configured to form a seal around the outer surface of the dielectric body. The outer sheath may thus encapsulate the outer surface of the dielectric body. The outer sheath may act to prevent fluid located in the environment around the radiating tip from entering a space between the outer sheath and the dielectric body. For example, a seal may be formed between the outer sheath and the dielectric body at a proximal end of the dielectric body and at a distal end of the dielectric body. Where the outer sheath includes a distal tip, a seal may only be needed at the proximal end of the dielectric body. In some cases, a seal may be formed between the outer sheath and the distal end of the coaxial feed cable, to prevent leakages at the interface between the coaxial feed cable and the radiating tip.

Where the cavity is on the outer surface of the dielectric body, the outer sheath may act to trap air (or some other fluid) in the cavity, and to prevent fluids in the surrounding environment from entering the cavity.

In some embodiments, the radiating tip may further include a dielectric choke. The dielectric choke may be a piece of electrically insulating material mounted with respect to the outer conductor (e.g. between the outer conductor and the proximal electrode) to reduce propagation of EM energy reflected at the radiating tip back down the coaxial feed cable. This may reduce an amount by which the radiation profile of the radiating tip extends along the coaxial feed cable, and provide an enhanced radiation profile.

The dielectric body may includes a helical body through which the elongate conductor extends. In other words, a portion of the dielectric body may be shaped as a helix, with the helix being wound around a length of the elongate conductor. The channel through which the elongate conductor extends may thus be formed by coils of the helix. The helical shape of the dielectric body may facilitate bending of the dielectric body, and may provide a substantially symmetrical stiffness of the dielectric body about the longitudinal axis of the dielectric body. The helical body may act as a helical spring, providing a high degree of flexibility of the radiating tip. Moreover, the helical shape of the dielectric body may facilitate the dielectric body returning to its original shape after being bent. For example, after bending to go through a winding passageway, the radiating tip may re-straighten due to the resilience of the dielectric body.

The helical dielectric body may comprise a third independent aspect of the present invention. According to this aspect there is provided an electrosurgical instrument comprising: a coaxial feed cable for conveying microwave energy and/or radiofrequency energy, the coaxial feed cable having an inner conductor, an outer conductor, and a dielectric material separating the inner conductor and the outer conductor; and a radiating tip disposed at a distal end of the coaxial feed cable to receive the microwave energy and/or the radiofrequency energy, the radiating tip comprising: an energy delivery structure configured to delivery the microwave energy and/or the radiofrequency energy received from the coaxial feed cable from an outer surface of the radiating tip, wherein the energy delivery structure comprises an elongate conductor electrically connected to the inner conductor and extending in a longitudinal direction beyond the distal end of the coaxial feed cable; and a dielectric body disposed around the elongate conductor; wherein the dielectric body includes a helical body through which the elongate conductor extends.

Features of the first aspect of the invention and the second aspect of the invention may be shared with the third aspect of the invention, and are not discussed again.

In some embodiments of the electrosurgical instrument of any of the aspects of the invention discussed above, the energy delivery structure may include a proximal tuning element and a distal tuning element, each of which is electrically connected to the elongate conductor, the proximal tuning element and the distal tuning element being longitudinally spaced apart by a length of the elongate conductor. The dielectric body may include a first dielectric spacer disposed between the proximal tuning element and the distal tuning element.

The proximal tuning element may be a piece of conductive material (e.g. metal) that is located near a proximal end of the radiating tip. The distal tuning element may be a piece of conductive material (e.g. metal) that is located near a distal end of the radiating tip. Thus, the distal tuning element may be further away from the distal end of the coaxial feed cable than the proximal tuning element. The proximal and distal tuning elements are both electrically connected to the elongate conductor. For example, the proximal and distal tuning elements may each be disposed on or around the elongate conductor. The proximal and distal tuning elements may be electrically connected to the elongate conductor by any suitable means. For example, the proximal and distal tuning elements may be welded or soldered to the elongate conductor. In another example, the proximal and distal tuning elements may be connected to the elongate conductor using a conductive adhesive (e.g. conductive epoxy). The proximal and distal tuning elements are spaced apart in a longitudinal direction by a length of the elongate conductor. In other words, a section of the elongate conductor is disposed between the proximal and distal electrodes. The proximal and distal tuning elements may be covered by a portion of the dielectric body, so that they are isolated/ protected from the environment.

The proximal and distal tuning elements may serve to shape the profile of microwave energy emitted by the radiating tip. In particular, the inventors have found that placing longitudinally spaced tuning elements on the elongate conductor may serve to produce a radiation profile that is concentrated around the radiating tip. The radiation profile may have an approximately spherical shape. The tuning elements may also serve to reduce a tail of the radiation profile that extends back along the coaxial feed cable. In this manner, microwave energy conveyed to the radiating tip may be emitted from the radiating tip and ablate surrounding target tissue in a well-defined volume around the radiating tip. The shape, size and location of the tuning elements may be selected to obtain a desired microwave radiation profile.

The first dielectric spacer may be a portion of the dielectric body that is located between the proximal tuning element and the distal tuning element. The channel in the dielectric body may be partially or entirely formed in the first dielectric spacer. In some cases, the proximal tuning element may be spaced apart from the distal end of the coaxial feed cable. In such a case, the dielectric body may include a second dielectric spacer disposed between the distal end of the coaxial feed cable and the proximal tuning element.

Where a cavity is formed in the dielectric body, the cavity may be formed in the first dielectric spacer. In some cases, the cavity may be formed in the second dielectric spacer. Alternatively, cavities may be formed in both the first and second dielectric spacers. This may further improve the flexibility of the radiating tip.

Where the radiating tip includes an outer sheath, the outer sheath may cover the outer surface of the first dielectric spacer. The outer sheath may be separate from the first dielectric spacer, to enable relative movement between the outer sheath and the first dielectric spacer. Where the dielectric body also includes a second dielectric spacer, the outer sheath may also cover the outer surface of the second dielectric spacer. The outer sheath may also cover outer surfaces of the proximal and distal tuning elements, to protect and isolate them from the environment.

In some embodiments of the electrosurgical instrument of any of the aspects of the invention discussed above, the energy delivery structure may comprise a distal electrode and a proximal electrode disposed on a surface of the dielectric body, the distal electrode and the proximal electrode being physically separated from each other by an intermediate portion of the dielectric body. The proximal electrode may be electrically connected to the outer conductor. The distal electrode may be electrically connected to the inner conductor via the elongate conductor.

As the proximal and distal electrodes are electrically connected to the outer and inner conductors, respectively, the proximal and distal electrodes may receive RF energy conveyed along the coaxial feed cable to serve as bipolar RF electrodes. In this manner, by conveying radiofrequency energy to the proximal and distal electrodes, biological tissue that is located between or around the electrodes may be ablated and/or coagulated. Furthermore, the longitudinal spacing between the proximal and distal electrodes enables the proximal and distal electrodes to behave as poles of a dipole antenna when microwave energy is conveyed along the coaxial feed cable. Thus, the radiating tip may behave as a microwave dipole antenna when microwave energy is conveyed along the coaxial feed cable. The spacing of the proximal and distal electrodes may depend on the microwave frequency used, and the loading caused by the target tissue. This configuration of the radiating tip therefore enables treatment of tissue using both RF and microwave energy. The inventors have also found that by switching between RF energy and microwave energy, it is possible to change the radiation profile (also referred to as an "ablation profile") of the instrument. In other words, the size and shape of the volume of tissue ablated by the electrosurgical instrument may be adjusted by switching between RF energy and microwave energy. This may enable the ablation profile to be changed in situ, without having to swap instruments during a surgical procedure.

The intermediate portion of the dielectric body may be a dielectric spacer located between the proximal electrode and the distal electrode. The channel in the dielectric body may be partially or entirely formed in the intermediate portion of the dielectric body.

Where a cavity is formed in the dielectric body, the cavity may be formed in the intermediate portion of the dielectric body. Where the radiating tip includes an outer sheath, the outer sheath may cover the outer surface of the intermediate portion of the dielectric body. The outer sheath may be separate from intermediate portion, to enable relative movement between the outer sheath and the dielectric body. The outer sheath may be arrange so that it does not cover the proximal and distal electrodes, i.e. the proximal and distal electrodes are exposed at a surface of the radiating tip. The outer sheath may be arranged so that it lies flush with the surfaces of the proximal and distal electrodes, so that the radiating tip has a smooth outer surface.

In some embodiments, the radiating tip may further include a tuning element mounted in the intermediate portion of the dielectric body. The tuning element may serve to shape the radiation profile, and improve impedance matching between the radiating tip and target tissue. The tuning element may comprise an electrically conductive body mounted within the intermediate portion of the dielectric body, the electrically conductive body being electrically connected to the elongate conductor. The tuning element may have dimensions selected to introduce a capacitance for improving the coupling efficiency of the radiating tip. For example, the electrically conductive body may be a sleeve mounted around a portion of the elongate conductor located between the proximal electrode and the distal electrode.

The electrosurgical instrument of any of the aspects of the invention discussed above may form part of a complete electrosurgical system. For example, the electrosurgical system may include an electrosurgical generator arranged to supply microwave energy and/or radiofrequency energy; and an electrosurgical instrument of the invention connected to receive the microwave energy and/or radiofrequency energy from the electrosurgical generator. The electrosurgical apparatus may further include a surgical scoping device (e.g. an endoscope) having a flexible insertion cord for insertion into a patient's body, wherein the flexible insertion cord has an instrument channel running along its length, and wherein the electrosurgical instrument is dimensioned to fit within the instrument channel.

In this specification "microwave" may be used broadly to indicate a frequency range of 400 MHz to 100 GHz, but preferably the range 1 GHz to 60 GHz. Preferred spot frequencies for microwave EM energy include: 915 MHz, 2.45 GHz, 3.3 GHz, 5.8 GHz, 10 GHz, 14.5 GHz and 24 GHz. 5.8 GHz may be preferred. In contrast, this specification uses "radiofrequency" or "RF" to indicate a frequency range that is at least three orders of magnitude lower, e.g. up to 300 MHz. Preferably, RF energy has a frequency that is high enough to prevent nerve stimulation (e.g. greater than 10 kHz), and low enough to prevent tissue blanching or thermal spread (e.g. lower than 10 MHz). A preferred frequency range for RF energy may be between 100 kHz and 1 MHz.

Herein, the terms "proximal" and "distal" refer to the ends of the electrosurgical instrument further from and closer to the treatment site, respectively. Thus, in use, the proximal end of the electrosurgical instrument is closer to a generator for providing the RF and/or microwave energy, whereas the distal end is closer to the treatment site, i.e. target tissue in the patient.

The term "conductive" is used herein to mean electrically conductive, unless the context dictates otherwise.

The term "longitudinal" used herein refers to the direction along the length of the electrosurgical instrument, parallel to the axis of the coaxial transmission line. The term "lateral" used herein refers to a direction normal to the longitudinal direction, e.g. a direction radially outwards from the longitudinal axis of the coaxial transmission line. The term "inner" means radially closer to the centre (e.g. axis) of the instrument. The term "outer" means radially further from the centre (axis) of the instrument.

The term "electrosurgical" is used in relation an instrument, apparatus or tool which is used during surgery and which utilises microwave and/or radiofrequency electromagnetic (EM) energy.

BRIEF DESCRIPTION OF THE DRAWINGS

Examples of the invention are discussed below with reference to the accompanying drawings, in which:

FIG. 4b is a cross-sectional view of a dielectric spacer of the electrosurgical instrument of FIG. 4a;

DETAILED DESCRIPTION; FURTHER OPTIONS AND PREFERENCES

Figure 1:
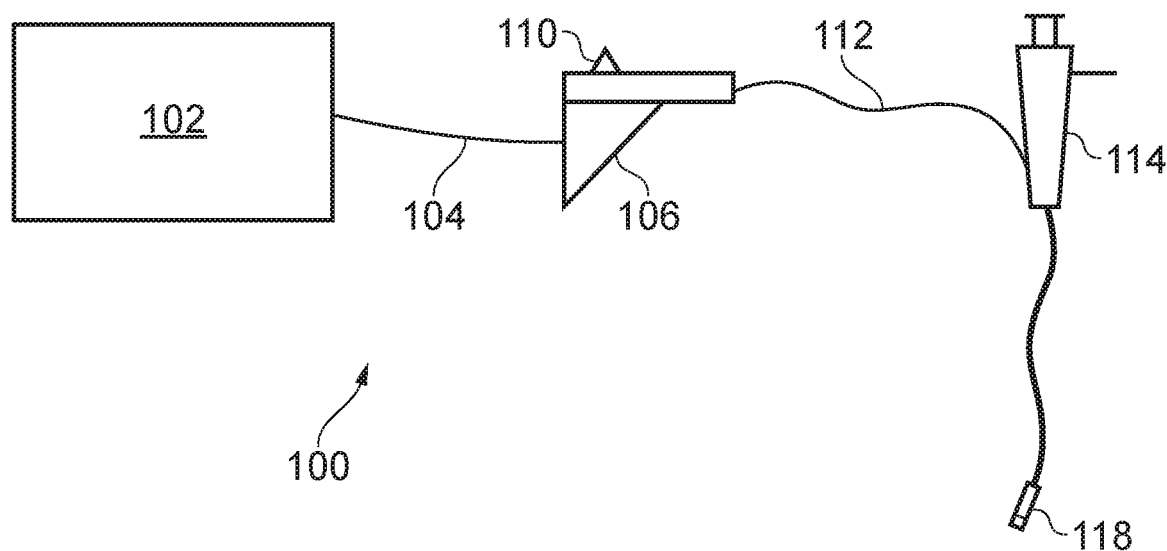
FIG. 1 is a schematic diagram of an electrosurgical system for tissue ablation that is an embodiment of the invention.

FIG. 1 is a schematic diagram of a complete electrosurgical system 100 that is capable of supplying microwave energy and radiofrequency energy to the distal end of an invasive electrosurgical instrument. The system 100 comprises a generator 102 for controllably supplying microwave and/or radiofrequency energy. A suitable generator for this purpose is described in WO 2012/076844, which is incorporated herein by reference. The generator may be arranged to monitor reflected signals received back from the instrument in order to determine an appropriate power level for delivery. For example, the generator may be arranged to calculate an impedance seen at the distal end of the instrument in order to determine an optimal delivery power level. The generator may be arranged to deliver power in a series of pulses which are modulated to match a patient's breathing cycle. This will allow for power delivery to occur when the lungs are deflated.

The generator 102 is connected to an interface joint 106 by an interface cable 104. If needed, the interface joint 106 can house an instrument control mechanism that is operable by sliding a trigger 110, e.g. to control longitudinal (back and forth) movement of one or more control wires or push rods (not shown). If there is a plurality of control wires, there may be multiple sliding triggers on the interface joint to provide full control. The function of the interface joint 106 is to combine the inputs from the generator 102 and instrument control mechanism into a single flexible shaft 112, which extends from the distal end of the interface joint 106. In other embodiments, other types of input may also be connected to the interface joint 106. For example, in some embodiments a fluid supply may be connected to the interface joint 106, so that fluid may be delivered to the instrument.

The flexible shaft 112 is insertable through the entire length of an instrument (working) channel of an endoscope 114.

The flexible shaft 112 has a distal assembly 118 (not drawn to scale in FIG. 1) that is shaped to pass through the instrument channel of the endoscope 114 and protrude (e.g. inside the patient) at the distal end of the endoscope's tube. The distal end assembly includes an active tip for delivering microwave energy and radiofrequency energy into biological tissue. The tip configuration is discussed in more detail below.

The structure of the distal assembly 118 may be arranged to have a maximum outer diameter suitable for passing through the working channel. Typically, the diameter of a working channel in a surgical scoping device such as an endoscope is less than 4.0 mm, e.g. any one of 2.8 mm, 3.2 mm, 3.7 mm, 3.8 mm. The length of the flexible shaft 112 can be equal to or greater than 0.3 m, e.g. 2 m or more. In other examples, the distal assembly 118 may be mounted at the distal end of the flexible shaft 112 after the shaft has been inserted through the working channel (and before the instrument cord is introduced into the patient). Alternatively, the flexible shaft 112 can be inserted into the working channel from the distal end before making its proximal connections. In these arrangements, the distal end assembly 118 can be permitted to have dimensions greater than the working channel of the surgical scoping device 114.

The system described above is one way of introducing the instrument into a patient's body. Other techniques are possible. For example, the instrument may also be inserted using a catheter.

Figure 2:
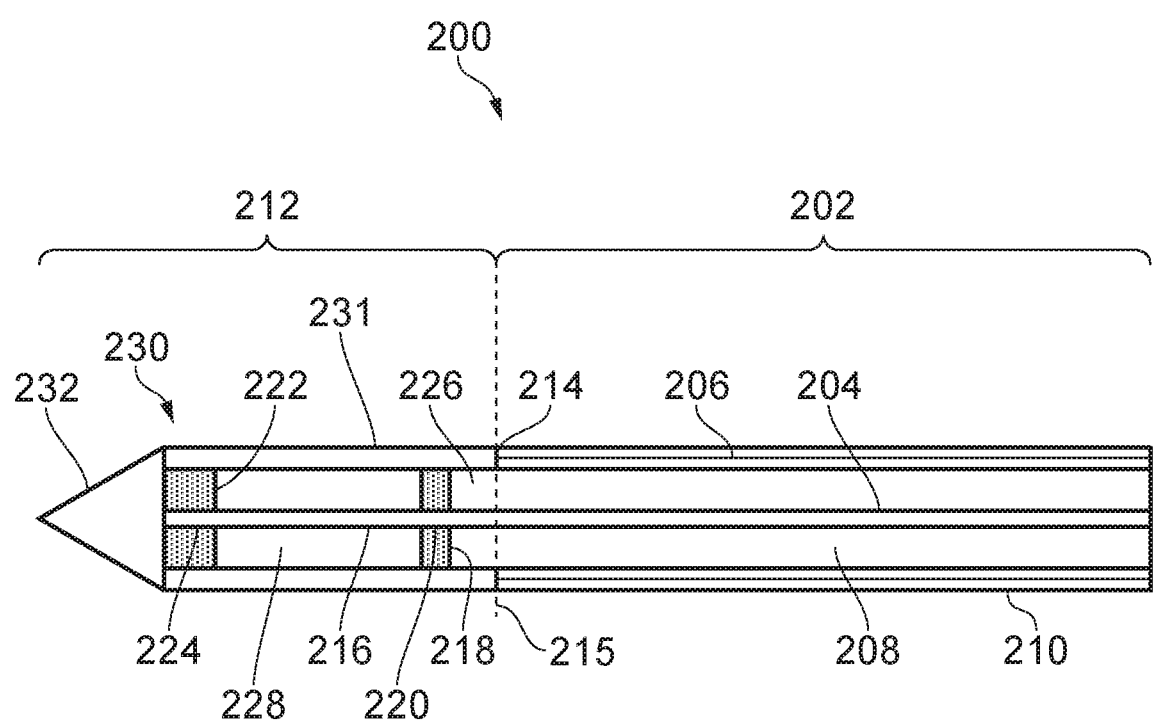
FIG. 2 is a schematic cross-sectional side view of an electrosurgical instrument that is an embodiment of the invention.

FIG. 2 shows a cross-sectional side view of an electrosurgical instrument 200 that is an embodiment of the invention. Electrosurgical instrument 200 is configured to ablate biological tissue by radiating microwave energy into the tissue. The distal end of the electrosurgical instrument may correspond, for example, to the distal assembly 118 discussed above. The electrosurgical instrument 200 includes a coaxial feed cable 202 that is connectable at its proximal end to a generator (such as generator 102) in order to convey microwave energy. The coaxial feed cable may correspond to the interface cable 104 mentioned above. The coaxial feed cable 202 comprises an inner conductor 204 and an outer conductor 206 which are separated by a dielectric material 208. The coaxial feed cable 202 is preferably low loss for microwave energy. A choke (not shown) may be provided on the coaxial feed cable 204 to inhibit back propagation of microwave energy reflected from the distal end and therefore limit backward heating along the device. The coaxial feed cable 202 further includes a flexible protective sheath 210 disposed around the outer conductor 206 to protect the coaxial feed cable. The protective sheath 210 may be made of an insulating material to electrically isolate the outer conductor 206 from its surroundings. The protective sheath 210 may be made of, or coated with, a non-stick material such as PTFE to prevent tissue from sticking to the instrument.

A radiating tip 212 is formed at the distal end 214 of the coaxial feed cable 202. The dashed line 215 in FIG. 2 illustrates the interface between the coaxial feed cable 202 and the radiating tip 212. The radiating tip 212 is arranged to receive microwave energy conveyed by the coaxial feed cable 202, and deliver the energy into biological tissue. The outer conductor 206 of the coaxial feed cable 202 terminates at the distal end 214 of the coaxial feed cable 202, i.e. the outer conductor 206 does not extend into the radiating tip 212. The radiating tip 212 includes a distal portion 216 of the inner conductor 204 which extends beyond the distal end of the coaxial feed cable 202. In particular, the distal portion 216 of the inner conductor 204 extends beyond a distal end of the outer conductor 206.

A proximal tuning element 218 made of a conductive material (e.g. metal) is electrically connected to the distal portion 216 of the inner conductor 204 near a proximal end of the radiating tip 212. The proximal tuning element 218 has a cylindrical shape, and includes a channel 220 through which the distal portion 216 of the inner conductor 204 passes. The proximal tuning element 218 may be secured to the inner conductor 204, e.g. using a conductive adhesive (e.g. conductive epoxy) or by soldering or welding. The proximal tuning element 218 is mounted so that it is centred on the inner conductor 204, so that it is disposed symmetrically about the longitudinal axis of inner conductor 204.

A distal tuning element 222 made of a conductive material (e.g. metal) is electrically connected to the distal portion 216 of the inner conductor 204 near a distal end of the radiating tip 212. Thus, the distal tuning element 222 is located further along the inner conductor 204 than the proximal tuning element 218. The distal tuning element 222 is spaced apart from the proximal tuning element by a length of the distal portion 216 of the inner conductor 204. Like the proximal tuning element 218, the distal tuning element has a cylindrical shape and includes a channel 224. As can be seen in FIG. 2, the distal portion 216 of the inner conductor 204 extends into the channel 224. The distal portion 216 of the inner conductor 204 terminates at a distal end of the channel 224, i.e. it does not protrude beyond the distal tuning element 222. The distal tuning element 222 may be secured to the inner conductor 204, e.g. using a conductive adhesive (e.g. conductive epoxy) or by soldering or welding. Like the proximal tuning element 218, the distal tuning element 222 is mounted so that it is centred on the inner conductor 204.

Both the proximal tuning element 218 and the distal tuning element 222 have the same outer diameter. The outer diameter of the proximal tuning element 218 and the distal tuning element 222 may be slightly less than the outer diameter of the electrosurgical instrument 200. In the example shown, the distal tuning element 222 is longer than the proximal tuning element 218 in the longitudinal direction of the instrument. For example, the distal tuning element 222 may be approximately twice as long as the proximal tuning element 218. By making the distal tuning element 222 longer than the proximal tuning element 218, it is possible to concentrate microwave emission around the distal end of the radiating tip 212.

A distal portion 226 of the dielectric material 208 extends beyond the distal end 214 of the coaxial feed cable 202 into the radiating tip 212. The distal portion 226 of the dielectric material 208 acts as a spacer between the proximal tuning element 218 and the distal end 214 of the coaxial feed cable 202. In some embodiments (not shown), the dielectric material 208 may terminate at the distal end 214 of the coaxial feed cable 202, and a separate spacer may be provided between the distal end 214 of the coaxial feed cable 202 and the proximal tuning element 218. A dielectric spacer 228 is provided in the radiating tip 212 between the proximal tuning element 218 and the distal tuning element 222. The dielectric spacer 228 is a cylindrical piece of dielectric material, having a central channel extending therethrough. Thus, the dielectric spacer 228 may be a tube of dielectric material. The distal portion 214 of the inner conductor 204 extends through the channel in the dielectric spacer 228. A proximal face of the dielectric spacer 228 is in contact with the proximal tuning element 218, and a distal face of the dielectric spacer 228 is in contact with the distal tuning element 222. The dielectric spacer 228 has approximately the same outer diameter as the proximal and distal tuning elements 218, 222.

Microwave energy conveyed along the coaxial feed cable 202 may be radiated along the length of the distal portion 216 of the inner conductor 204, to ablate target tissue. The radiation profile of electrosurgical instrument 200 is discussed below in relation to FIG. 8.

The radiating tip 212 further includes an outer sheath 230 which is provided on the outside of the radiating tip 212. The outer sheath 230 covers the dielectric spacer 228 and the proximal and distal tuning elements 218, 222 to form an outer surface of the radiating tip 212. The outer sheath 230 may serve to insulate the radiating tip 212 and protect it from the environment. An outer diameter of the protective sheath 230 is substantially the same as the outer diameter of the coaxial feed cable 202, so that the instrument has a smooth outer surface. In particular, the outer surface of the sheath 230 may be flush with the outer surface of the coaxial feed cable 202 at the interface 215. The outer sheath 230 is secured at its proximal end to a distal end of the protective sheath 210. A seal may be formed between the outer sheath 230 and the protective sheath 210 to prevent fluids from leaking into the instrument at the interface between the coaxial feed cable 202 and the radiating tip 212. In some embodiments (not shown) the outer sheath 230 may be a continuation of the protective sheath 210 of the coaxial feed cable 202.

The outer sheath 230 includes a pointed distal tip 232 which covers a distal end of the radiating tip 212. The distal tip 232 is connected to a sleeve portion 231 of the outer sheath 230 that covers the outer surface of the dielectric spacer 228. Thus, the outer sheath 230 forms a cap around the outside of the radiating tip 212. The distal tip 232 may be pointed in order to facilitate insertion of the radiating tip 212 into target tissue. However, in other embodiments (not shown), the distal tip may be rounded or flat.

Together, the dielectric spacer 228 and the distal portion 226 of dielectric material 208 may form a dielectric body of the radiating tip 212. The outer sheath 230 (including distal tip 232) is formed separately from the dielectric body of the radiating tip. In particular, the outer sheath 230 is not affixed to dielectric body of the radiating tip (e.g. via an adhesive or otherwise). The outer sheath may also not be secured to the proximal or distal tuning elements 218, 222. The outer sheath 230 is thus held on the radiating tip 212 via its connection to the protective sheath 210, and via frictional forces between the outer sheath 230 and the dielectric body of the radiating tip 212. As a result, a small amount of relative movement and flexure between the outer sheath 230 and the dielectric body of the radiating tip 212 may be possible. The range of relative movement between the outer sheath 230 and the dielectric body may depend on the relative stiffness (flexibility) of the outer sheath and the dielectric body.

The ability of the dielectric body to flex may facilitate bending of the radiating tip 212, as movement of the outer sheath 230 relative to the dielectric body can enable stresses in the outer sheath 230 (that may occur e.g. when the radiating tip 212 is bent) to be relaxed. For example, the outer sheath 230 may "bunch up" around the inside of a bend in the radiating tip 212, and/or become spaced apart from the dielectric body around the inside of a bend in the radiating tip 212. Additionally, by allowing relative movement between the outer sheath 230 and the dielectric body of the radiating tip 212, stresses at an interface between the dielectric body and the outer sheath 230 may be avoided.

The outer sheath 230 is made of a dielectric material having a lower melting temperature than the dielectric body of the radiating tip 212. For example, the outer sheath 230 may be made of FEP, whilst the dielectric spacer 228 may be made of PTFE. The outer sheath may be formed by melting or shrinking the dielectric material of the outer sheath 230 over the dielectric body. For example, the outer sheath 230 may be formed by a length of heat shrink tubing. In this manner, the outer sheath 230 may be formed directly on the dielectric body of the radiating tip 212, whilst ensuring that the outer sheath 230 does not merge with the dielectric body during manufacture. The outer sheath 230 may be integrally formed as a single piece, i.e. the sleeve portion 231 and the distal tip 232 may be formed as a single part. Alternatively, the sleeve portion 231 and the distal tip 232 may be formed separately, and subsequently assembled together.

Figure 3:
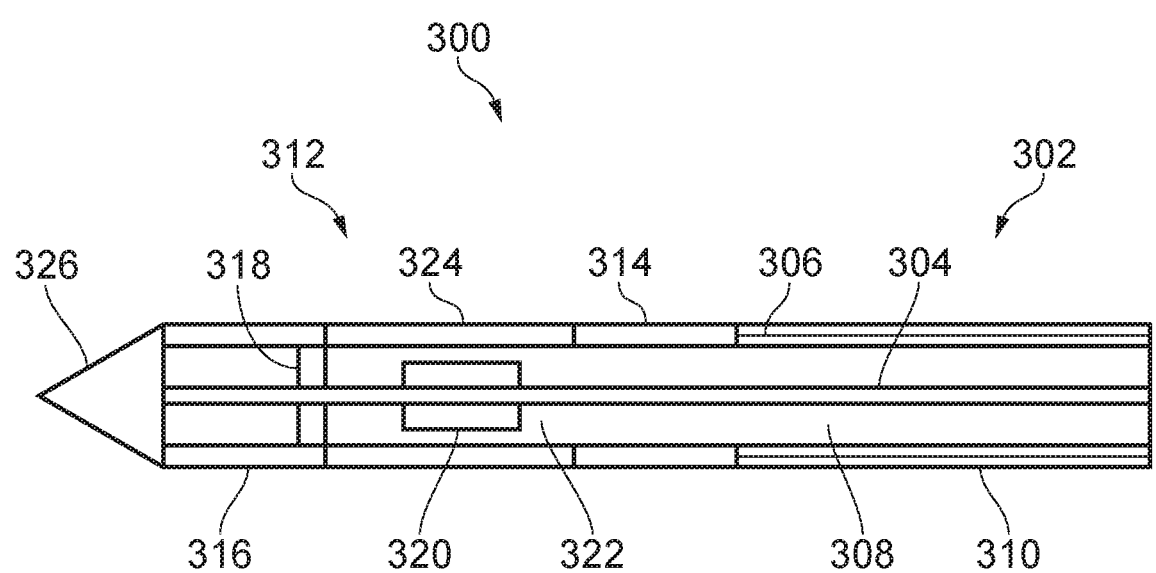
FIG. 3 is a schematic cross-sectional side view of an electrosurgical instrument that is another embodiment of the invention.

FIG. 3 shows a cross-sectional side view of an electrosurgical instrument 300 that is another embodiment of the invention. Electrosurgical instrument 300 is configured for the delivery of both microwave and RF energy into target tissue, either separately or simultaneously. The distal end of the electrosurgical instrument may correspond, for example, to the distal assembly 118 discussed above.

The electrosurgical instrument 300 includes a coaxial feed cable 302 that is connectable at its proximal end to a generator (such as generator 102) in order to convey microwave energy and RF energy. The coaxial feed cable 302 comprises an inner conductor 304 and an outer conductor 306 which are separated by a dielectric material 308. The coaxial feed cable further includes a flexible protective sheath 310 disposed around the outer conductor 306 to protect the coaxial feed cable 302. The coaxial feed cable 302 may be similar to coaxial feed cable 202 described above.

A radiating tip 312 is formed at the distal end of the coaxial feed cable 302. The radiating tip 312 is arranged to receive microwave energy and RF energy conveyed by the coaxial feed cable 302, and deliver the energy into biological tissue. The radiating tip 312 includes a proximal electrode 314 located near a proximal end of the radiating tip 312, and a distal electrode 316 located near a distal end of the radiating tip 312. The proximal electrode 314 is a hollow cylindrical conductor that forms an exposed ring around an outer surface of the radiating tip 312. The proximal electrode 214 is electrically connected to the outer conductor 306 of the coaxial feed cable 302. For example, the proximal electrode 314 may be welded or soldered to the outer conductor 306. The proximal electrode 314 may be electrically connected to the outer conductor 306 by a region of physical contact that extends around the whole circumference of the outer conductor 306, in order to ensure axial symmetry of the connection. The outer conductor 206 terminates at the proximal electrode 314, i.e. it does not extend beyond the proximal electrode 314 in a distal direction. In some embodiments (not shown), the proximal electrode may be an exposed distal portion of the outer conductor 306.

The distal electrode 316 is also a hollow cylindrical conductor that forms an exposed ring around an outer surface of the radiating tip 312. Like the proximal electrode 314, the distal electrode 316 is arranged coaxially with the coaxial feed cable 302. The proximal and distal electrodes 314, 316 may have substantially the same shape and size. The distal electrode 316 is spaced apart from the proximal electrode 314 in the longitudinal direction of the electrosurgical instrument 300. The proximal and distal electrodes 314, 316 have an outer diameter which is the same as an outer diameter of the coaxial feed cable 302, so that the electrosurgical instrument 300 has a smooth outer surface. This may prevent tissue from catching on the proximal and distal electrodes 314, 316.

The proximal electrode 314 defines a passageway through which a distally protruding portion of the inner conductor 304 passes. In this manner, the inner conductor 304 extends into the radiating tip 312, where it is electrically connected to the distal electrode 316. The inner conductor 304 is electrically connected to the distal electrode 316 via a conductor 318 that extends radially (i.e. outwards) from the inner conductor 306. The conductor 318 may comprise one or more branches (e.g. wires or other flexible conductive elements) that are arranged symmetrically about the axis of the inner conductor 304. Alternatively, the conductor 318 may comprise a conductive disc or ring mounted around the inner conductor 304 and connected between the inner conductor 304 and the distal electrode 316. The connection between the inner conductor 304 and the distal electrode 316 is preferably symmetric around the axis defined by the inner conductor 204. This can facilitate formation of a symmetrical field shape around the radiating tip 312.

A distal portion of the dielectric material 308 of the coaxial feed cable 302 also extends beyond a distal end of the outer conductor 306 and into the radiating tip 312 via the passageway defined by the proximal electrode 314. The inner conductor 304 and the proximal electrode 314 are thus isolated by the dielectric material 308. The distal portion of the dielectric material 308 forms a dielectric body of the radiating tip 312. A tuning element 320 is located in an intermediate portion 322 of the dielectric body of the radiating tip 312, located between the proximal electrode 314 and the distal electrode 316. The tuning element 320 is an electrically conductive element that is electrically connected to the inner conductor 304 between the proximal electrode 314 and the distal electrode 316 to introduce a capacitive reactance. In this example, the conductive tuning element 320 is cylindrically shaped, and is arranged coaxially with the inner conductor 304. The tuning element 320 may serve to improve the coupling efficiency (i.e. reduce the reflected signal) when the instrument is operated at microwave frequencies.

As the proximal electrode 314 and the distal electrode 316 are electrically connected to the outer conductor 306 and the inner conductor 304, respectively, they may be used as bipolar RF cutting electrodes. For example, the distal electrode 316 may act as an active electrode and the proximal electrode 314 may act as a return electrode for RF energy conveyed along the coaxial feed cable 302. In this manner, target tissue disposed around the radiating tip 312 may be cut and/or coagulated using RF energy, via the mechanisms discussed above.

Additionally, the radiating tip 312 may behave as a microwave dipole antenna, when microwave energy is conveyed along the coaxial feed cable 302. In particular, the proximal electrode 314 and the distal electrode 316 may act as radiating elements of the dipole antenna at microwave frequencies. Thus, the radiating tip structure enables both radiofrequency energy and microwave energy to be delivered into target tissue. This enables target tissue to be ablated and/or coagulated using radiofrequency and microwave energy, depending on the type of EM energy conveyed to the radiating tip. The cylindrical shapes of the proximal and distal electrodes 314, 316 may serve to produce a radiation profile that is symmetric about a longitudinal axis of the instrument 300.

The radiating tip 312 includes an outer sheath 324. The outer sheath 324 covers an outer surface of the intermediate portion 322 of the dielectric material 308 between the proximal electrode 314 and the distal electrode 316. The outer sheath 324 lies flush with the exposed surfaces of the proximal and distal electrodes 314, 316, so that the radiating tip 312 has a smooth outer surface. The outer sheath 324 may serve to protect and insulate the portion of the radiating tip 312 between the proximal and distal electrodes 314, 316. The outer sheath 324 is formed separately from the dielectric material 308. In particular, the outer sheath 324 is not affixed to the dielectric material 308 (e.g. via an adhesive or otherwise). The outer sheath 324 may be held on the radiating tip 312 by the proximal and distal electrodes 314, 316 which may block movement of the outer sheath 324 in the longitudinal direction (because the proximal electrode 314, distal electrode 316 and outer sheath 324 all have the same outer diameter). The outer sheath 324 may also be held in place by frictional forces between the outer sheath 324 and the dielectric material 308. As a result, a small amount of movement and flexure between the outer sheath 324 and the intermediate portion 322 of the dielectric material 308 may be possible. The range of relative movement between the outer sheath 324 and the intermediate portion 322 may depend on the relative stiffness (flexibility) of the outer sheath 324 and the intermediate portion 322. The radiating tip 312 further includes a distal tip 326 at its distal end. The distal tip is pointed for facilitating insertion of the radiating tip 312 into target tissue.

Similarly to instrument 200, this configuration of the outer sheath 324 may facilitate bending of the radiating tip 312. In particular, by allowing some movement between the outer sheath 324 and the intermediate portion 322 of the dielectric material 308, stresses in the outer sheath 324 that may arise when the radiating tip is bent can be relaxed. Stresses at an interface between the intermediate portion 322 and the outer sheath 324 may also be avoided.

The outer sheath 324 may be formed in a similar manner to outer sheath 230 discussed above. For example, the outer sheath 324 may be made of FEP which is melted or shrunk around the intermediate portion 322 of the dielectric material 208. The intermediate portion 322 of the dielectric material 208 may be made of a material having a higher melting temperature than FEP (e.g. PTFE), so that it does not melt during formation of the outer sheath 324.

The flexibility of the radiating tip of an electrosurgical instrument may also be increased by modifying the shape the dielectric material in the radiating tip. In particular, one or more cavities may be formed in the dielectric material of the radiating tip to facilitate bending.

Figure 4A:
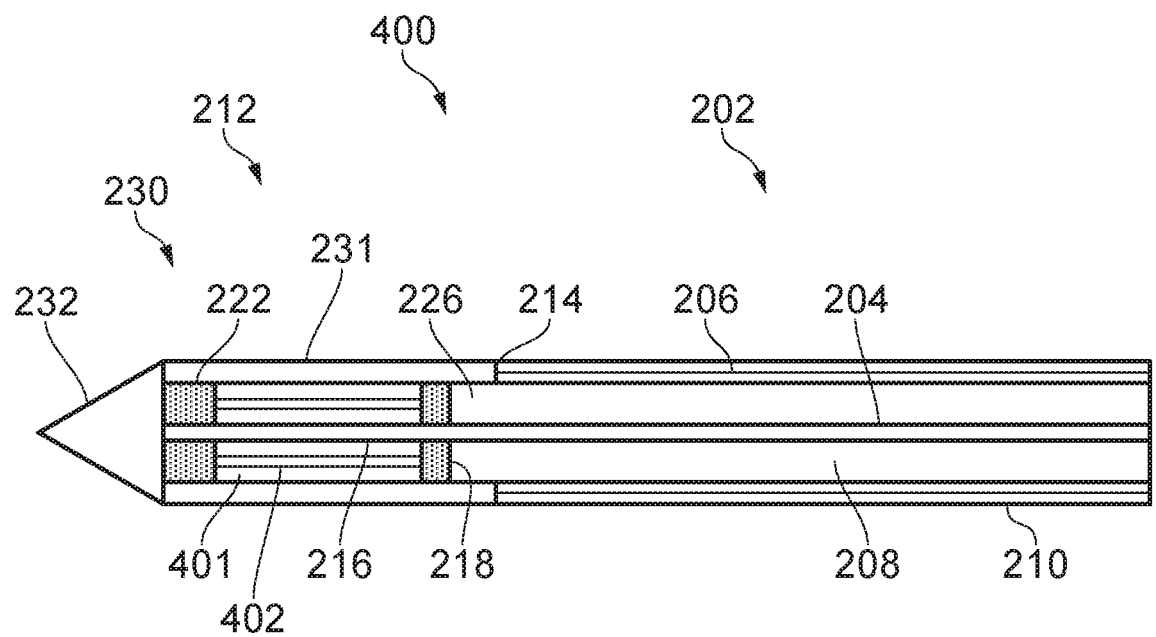
FIG. 4a is a schematic cross-sectional side view of an electrosurgical instrument that is an embodiment of the invention.

FIG. 4a shows a cross-sectional view of an electrosurgical instrument 400 that is an embodiment of the invention. Electrosurgical instrument 400 is similar to electrosurgical instrument 200 described above, except that its dielectric spacer includes an annular lumen extending therethrough. Reference numerals corresponding to those used in FIG. 2 are used in FIG. 4a to indicate features of the electrosurgical instrument 400 corresponding to features described above in relation to FIG. 2.

Figure 4B:
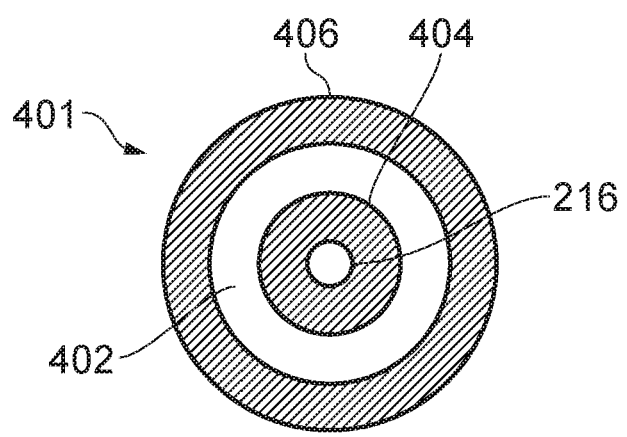

Electrosurgical instrument 400 includes a dielectric spacer 401 in its radiating tip 212, between the proximal tuning element 218 and the distal tuning element 222. Dielectric spacer 401 is similar to dielectric spacer 228 of electrosurgical instrument 200, except that it includes an annular lumen 402 extending therethrough. The annular lumen 402 extends in a longitudinal direction along the length of the dielectric spacer 401. FIG. 4b shows a cross-sectional view of dielectric spacer 401 of electrosurgical instrument 400, in a plane normal to the longitudinal direction of the electrosurgical instrument 400. As can be seen, the annular lumen 402 has an annular (e.g. circular) cross-section that encircles the distal portion 216 of the inner conductor 204. The annular lumen 402 is formed between an inner portion 404 of the dielectric spacer 401, through which the distal portion 216 of the inner conductor extends, and an outer portion 406 of the dielectric spacer 401, which forms a sleeve around the inner portion 404. The annular lumen 402 is coaxially arranged around the distal portion 216 of the inner conductor 204. In other words, the annular lumen 402 is substantially symmetrical about the longitudinal axis of the inner conductor 204.

The annular lumen 402 forms a cavity (or void) within the dielectric spacer 401, i.e. it forms a tubular region within the dielectric spacer 401 where the dielectric material of the dielectric spacer 401 is absent. The annular lumen 402 may be filled, for example, with air. As a result, the amount of material in the dielectric spacer 401 (e.g. compared to the dielectric spacer 228 of electrosurgical instrument 200) is reduced. In particular, as shown in FIG. 4b, the cross-sectional area of the dielectric spacer 401 which includes dielectric material is reduced by an amount corresponding to the cross-sectional area of the annular lumen 402. Generally speaking, the stiffness of a body is proportional to the cross-sectional area of the material forming that body. Thus, by forming the annular lumen 402 in the dielectric spacer 228, the stiffness of the dielectric spacer 401 may be reduced, which may facilitate bending of the dielectric spacer 401 along its length. As the annular lumen 402 is disposed symmetrically about the longitudinal axis of the instrument, the stiffness of the dielectric spacer 401 may be substantially symmetrical about the longitudinal axis. As a result, bending of the dielectric spacer 401 may be facilitated in all directions lying in a plane normal to the longitudinal axis.

Figure 5A:
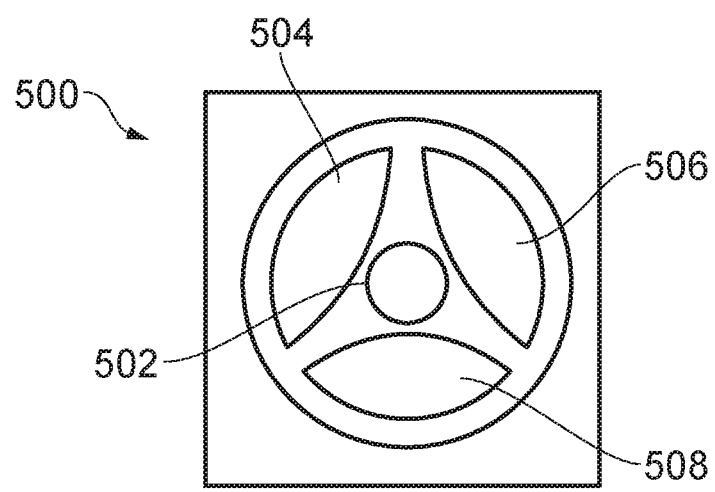
FIGS. 5a-5c are cross-sectional views of dielectric spacers that may be used in an electrosurgical instrument according to an embodiment of the invention.
Figure 5B:
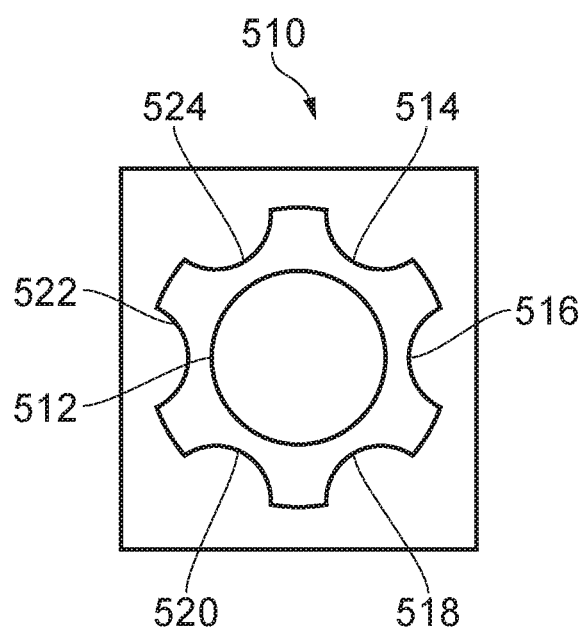
Figure 5C:
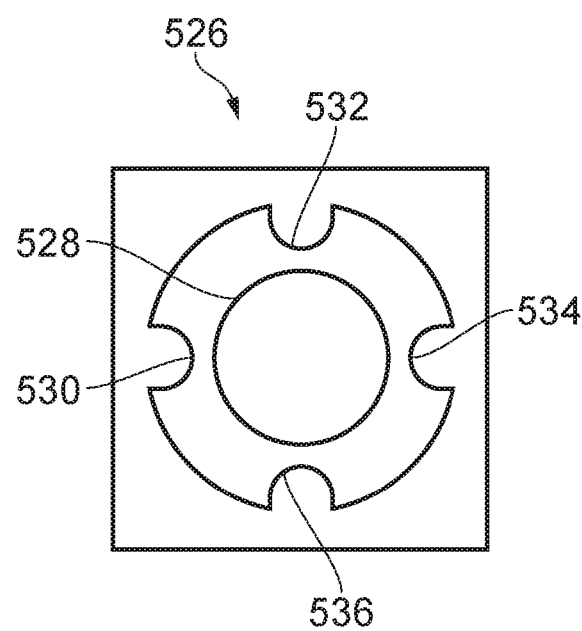

Different types of lumen or cavity, other than the annular lumen 402 shown in FIGS. 4a and 4b may be used to improve the flexibility of the radiating tip. FIGS. 5a-5c show cross-sectional views (in a plane normal to the longitudinal axis) of dielectric spacers having different shapes of lumen extending therethrough. The dielectric spacers illustrated in FIGS. 5a-5c may, for example, replace dielectric spacer 401 in electrosurgical instrument 400.

FIG. 5a shows a cross-sectional view of a dielectric spacer 500. Dielectric spacer 500 includes a central channel 502, through which the distal portion 216 of the inner conductor 204 may extend. The dielectric spacer 500 also includes three lumens 504, 506, 508 which are disposed around the central channel 502. The lumens 504, 506, 508 are arranged such that they are substantially rotationally symmetrical about the longitudinal axis. The lumens 504, 506, 508 may extend in the longitudinal direction along the length of the dielectric spacer 500. The lumens 504, 506, 508 may be filled with air. Similarly to annular lumen 402, lumens 504, 506, 508 serve to reduce the stiffness of the dielectric spacer 500, to improve flexibility of the radiating tip.

FIG. 5b shows a cross-sectional view of another dielectric spacer 510. The dielectric spacer 510 includes a central channel 512, through which the distal portion 216 of the inner conductor 204 may extend. The central channel 512 may have a larger cross-section than the distal portion 216 of the inner conductor 204, so that a space is formed between the wall of the central channel 512 and the distal portion 216. Thus, the central channel 512 may act as a cavity within the dielectric spacer 500, to reduce its stiffness. The dielectric spacer 510 also includes a series of open lumens 514-524 (or grooves) formed on its outer surface. The open lumens 514-524 are arranged such that they are substantially rotationally symmetrical about the longitudinal axis. The open lumens 514-524 may reduce the stiffness of dielectric spacer 510. Air may be trapped in the open lumens by means of an outer sheath (e.g. outer sheath 230) which is formed over the outer surface of the dielectric spacer.

FIG. 5c shows a cross-sectional view of another dielectric spacer 526. Dielectric spacer 526 is similar to dielectric spacer 510, as it includes a central channel 528, through which the distal portion 216 of the inner conductor 204 may extend, and a series of open lumens 530-536 arranged on its outer surface. The open lumens 530-536 are arranged such that they are substantially rotationally symmetrical about the longitudinal axis.

The cavities or lumens need not extend along the whole length of the dielectric spacer. For example, a lumen or cavity may only extend along a portion of the dielectric spacer, or may have one or more radial support arm spanning therethrough. In some cases, multiple lumens or cavities may be provided, which extend along different portions of the dielectric spacer. Different types of cavity or lumen may be combined within a dielectric spacer. Where it is desired for the radiating tip to be preferentially bendable in a particular direction, the cavities or lumens may be disposed on the corresponding side of the dielectric spacer, to reduce the stiffness of the spacer on that side. In some embodiments (not shown), lumens may be formed in the distal portion 226 of the dielectric material 208, to improve flexibility of the radiating tip 212 near the interface with the coaxial feed cable 202. The cavities or lumens discussed above may be incorporated into other electrosurgical instruments to improve the flexibility of the radiating tip. For example, electrosurgical instrument 300 discussed above may be modified so that the intermediate portion 322 of the dielectric material 308 includes one or more lumens extending therethrough.

Figure 6:
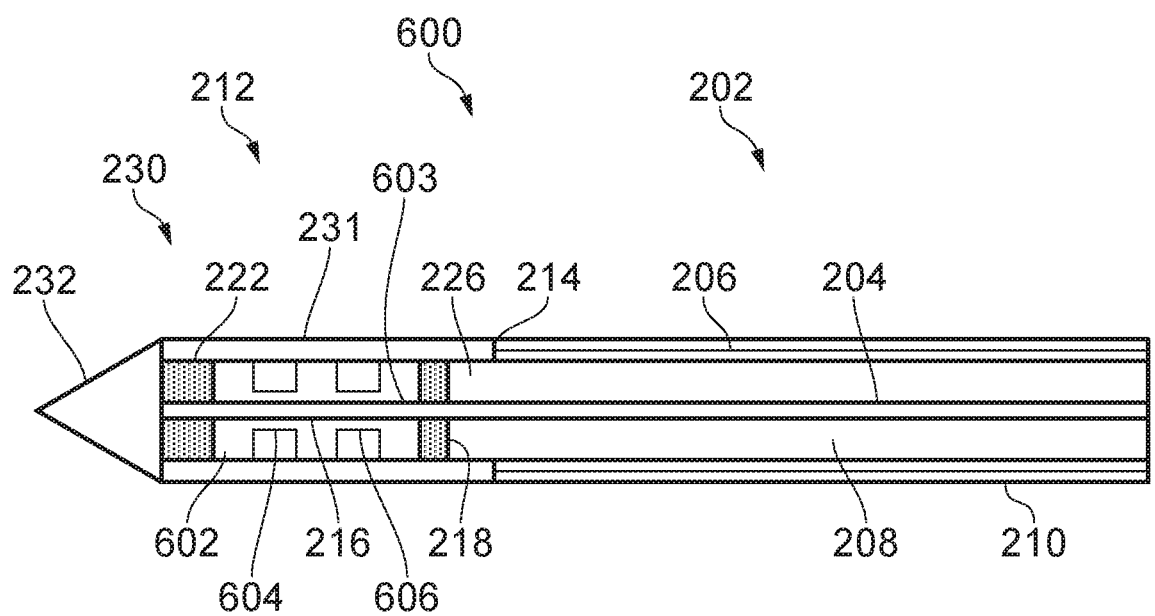
FIG. 6 is a schematic cross-sectional side view of an electrosurgical instrument that is another embodiment of the invention.

FIG. 6 shows a cross-sectional view of an electrosurgical instrument 600 that is another embodiment of the invention. Electrosurgical instrument 600 is similar to electrosurgical instrument 200 described above, except that its dielectric spacer includes is shaped to improve its flexibility. Reference numerals corresponding to those used in FIG. 2 are used in FIG. 6 to indicate features of the electrosurgical instrument 600 corresponding to features described above in relation to FIG. 2.

Figure 7B:
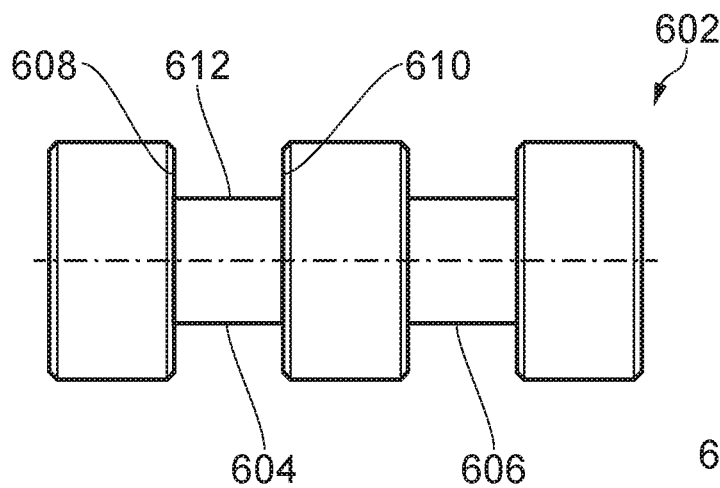
FIGS. 7a and 7b are perspective views of a dielectric spacer of the electrosurgical instrument of FIG. 6.
Figure 7A:
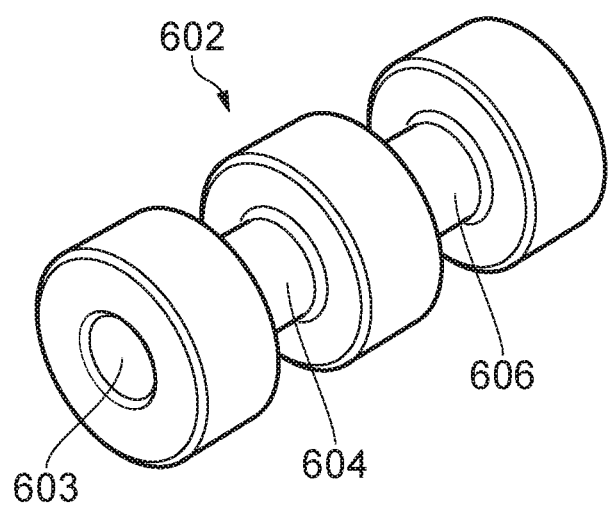

Electrosurgical instrument 600 includes a dielectric spacer 602 in its radiating tip 212, between the proximal tuning element 218 and the distal tuning element 222. The dielectric spacer 602 has a generally cylindrical shape. The dielectric spacer 602 includes a channel 603 through its centre, in which the distal portion 216 of the inner conductor 204 extends. A first annular groove 604 and a second annular groove 606 are formed in an outer surface of the dielectric spacer 602. The first groove 604 and the second groove 606 each form a loop around the outer surface of the dielectric spacer 602. FIG. 7a shows a perspective view of dielectric spacer 602, and FIG. 7b shows a side view of dielectric spacer 602. The first groove 604 and the second groove 606 form regions in the dielectric spacer 602 where the cross-sectional area of the dielectric spacer 602 is reduced (e.g. compared to areas of the dielectric spacer 602 away from the grooves). The dielectric spacer 602 may therefore have a lower stiffness in the grooves 604, 606 than outside the grooves, such that bending of the dielectric spacer 602 is facilitated at the grooves 604, 606. The first and second grooves 604, 606 may therefore act as bending points or flexures for the dielectric spacer. The first and second grooves 604, 606 may thus serve to improve the flexibility of the radiating tip 212.

The sleeve portion 231 of the outer sheath 230 covers the outer surface of the dielectric spacer 602. In this manner, the first and second grooves 604, 606 are covered by the outer sheath 230, so that the radiating tip 212 has a smooth outer surface. Air may be trapped in the first and second grooves 604, 606 by the outer sheath.

In other embodiments (not shown), a larger number of grooves may be provided in the outer surface of the dielectric spacer to provide further bending points for the dielectric spacer. Grooves may also be formed on the inner surface of the dielectric spacer, e.g. on the wall of the channel 603 through which the distal portion 216 of the inner conductor 204 extends, to further improve the flexibility of the dielectric spacer. In the example shown, the first and second grooves 604, 606 have a rectangular profile, i.e. they have sidewalls 608, 610 which are parallel to each other, and an inner wall 612 which is perpendicular to sidewalls 608, 610 (see FIG. 7b). However, other shapes of groove may also be used. For example, the sidewalls 608, 610 may be at an oblique angle relative to each other. In some cases, the grooves may have a triangular profile, or a rounded profile. Combinations of grooves having different profiles may be used on the same dielectric spacer. In some embodiments (not shown), grooves may be formed in the distal portion 226 of the dielectric material 208, to improve flexibility of the radiating tip 212 near the interface with the coaxial feed cable 202. The concept of forming grooves or indentations in a surface of the dielectric spacer may be incorporated into other electrosurgical instruments to improve the flexibility of the radiating tip. For example, electrosurgical instrument 300 may be modified so that grooves are formed in the intermediate portion 322 of the dielectric material 308, to provide bending points in the radiating tip 312.

Figure 8:
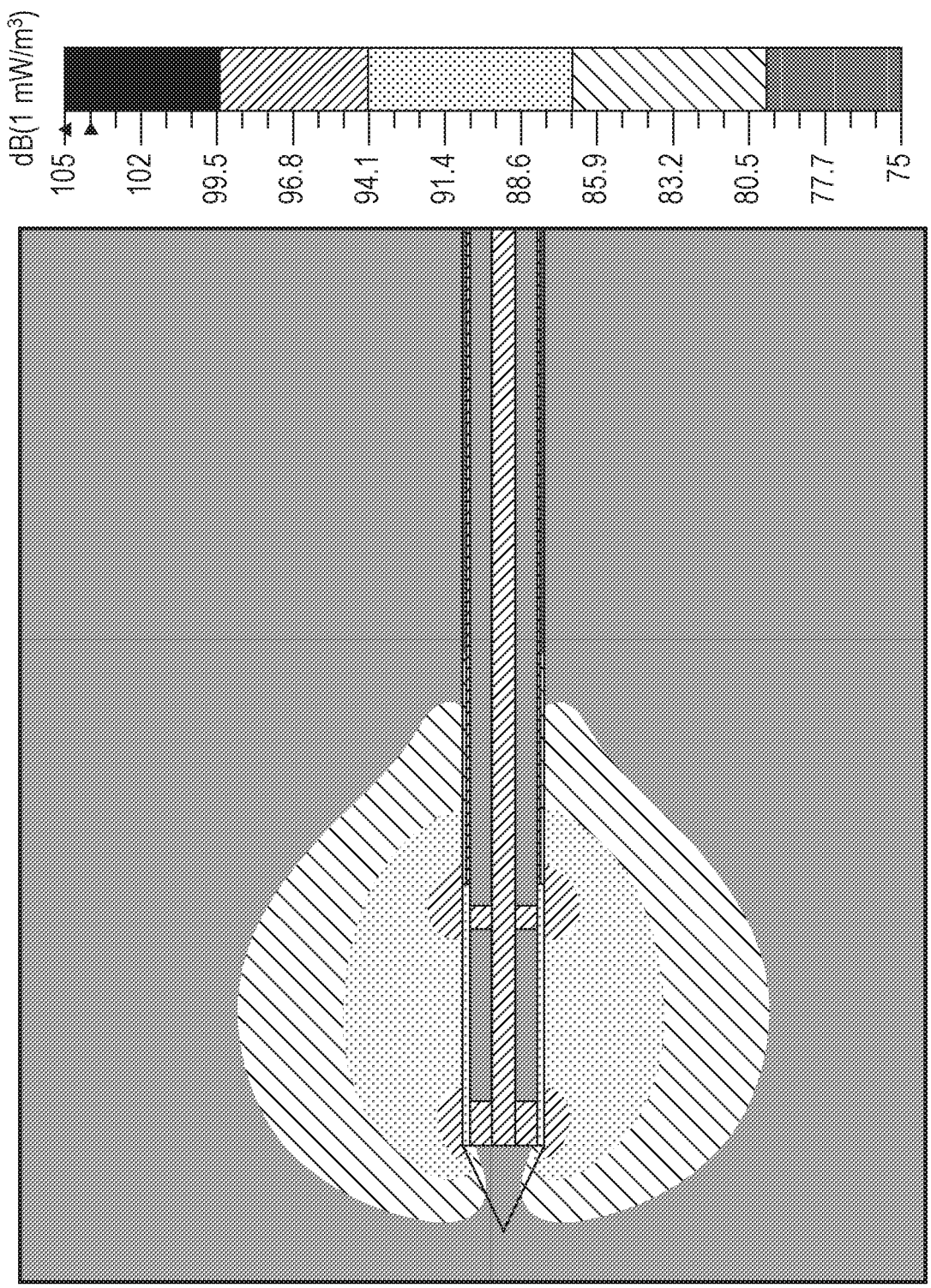
FIG. 8 is a diagram showing a simulated radiation profile for the electrosurgical instrument of FIG. 2.

FIG. 8 shows a simulated radiation profile in target tissue for the electrosurgical instrument 200. The radiation profile was simulated for a microwave frequency of 5.8 GHz, using finite element analysis software. The radiation profile is indicative of the resultant volume of tissue ablated by the microwave energy. As can be seen in FIG. 8, the radiation profile is concentrated around the radiating tip, and defines an approximately spherical region.

Figure 9:
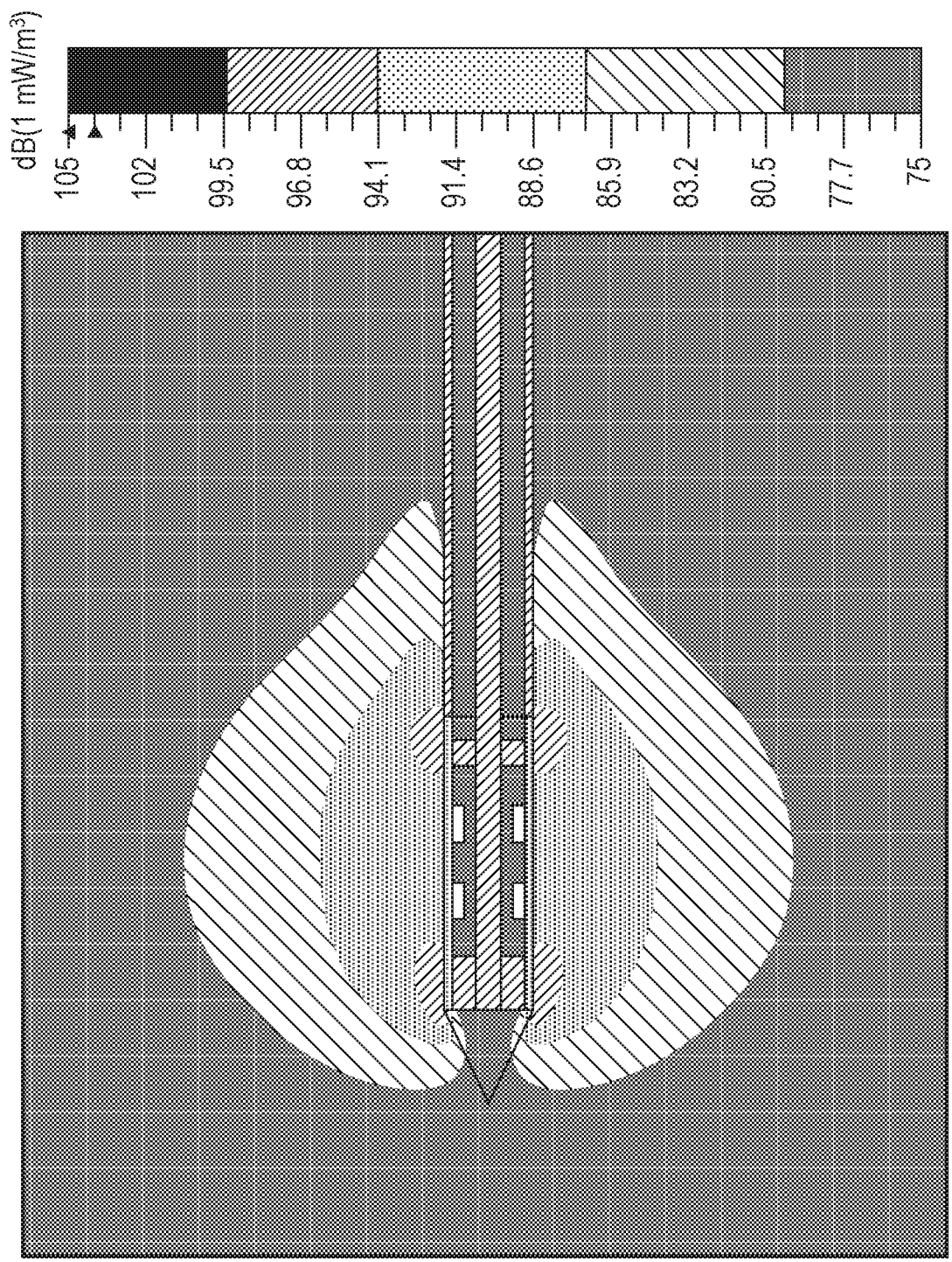
FIG. 9 is a diagram showing a simulated radiation profile for the electrosurgical instrument of FIG. 6.

FIG. 9 shows a simulated radiation profile in target tissue for the electrosurgical instrument 600. The radiation profile was simulated for a microwave frequency of 5.8 GHz, using finite element analysis software. Like the radiation profile shown in FIG. 8, the radiation profile for electrosurgical instrument 600 is concentrated around the radiating tip, and defines an approximately spherical region. The shape of the radiation profile of electrosurgical instrument 600 is not noticeably affected by the presence of the first and second grooves 604, 606 in the dielectric spacer 602. Thus, the first and second grooves 604, 606 may improve the flexibility of the radiating tip, without significantly affecting the radiation profile of the radiating tip.

Figure 10:
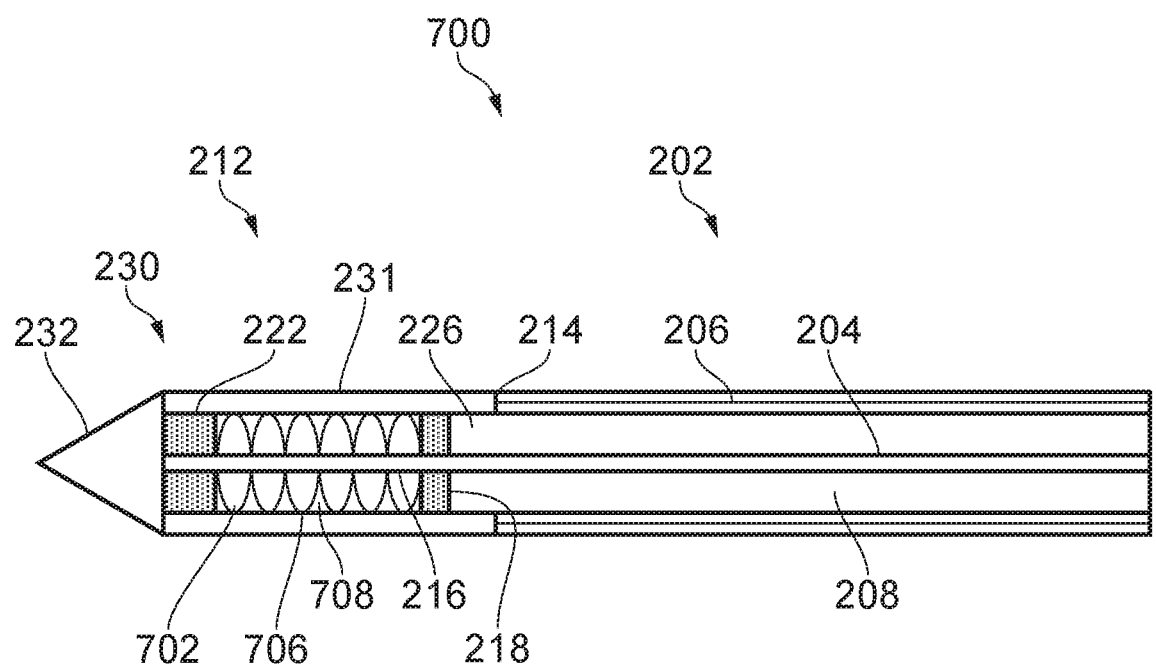
FIG. 10 is a schematic cross-sectional side view of an electrosurgical instrument that is another embodiment of the invention.

FIG. 10 shows a cross-sectional view of an electrosurgical instrument 700 that is another embodiment of the invention. Electrosurgical instrument 700 is similar to electrosurgical instrument 200 described above, except that its dielectric spacer is corrugated to improve its flexibility. Reference numerals corresponding to those used in FIG. 2 are used in FIG. 10 to indicate features of the electrosurgical instrument 700 corresponding to features described above in relation to FIG. 2.

Electrosurgical instrument 700 includes a dielectric spacer 702 in its radiating tip 212, between the proximal tuning element 218 and the distal tuning element 222. The dielectric spacer 702 is formed of a length of corrugated (or convoluted) tubing. The length of corrugated tubing may, for example, be made of PTFE or PFA. The dielectric spacer 702 defines a channel (or passageway), through which the distal portion of the inner conductor 204 extends. Corrugations on the outer surface of the dielectric spacer 702 define a series of regularly spaced peaks (e.g. peaks 704, 706) and troughs (e.g. trough 708) located between the peaks. The troughs in the corrugated outer surface correspond to grooves or indentations on the outer surface of the dielectric spacer 702, i.e. to regions where the dielectric spacer has a smaller outer diameter (e.g. compared to the regions where the peaks are located). As such, the troughs (grooves) may behave as bending points or flexures for the dielectric body 702. Thus, the corrugated outer surface of the dielectric spacer 702 provides a series of regularly spaced bending points, which may facilitate bending of the dielectric spacer 702 along its length. This may result in a radiating tip 212 which is highly flexible.

The outer sheath 230 covers the corrugated outer surface of the dielectric spacer 702, so that the radiating tip 212 has a smooth outer surface. Air may be trapped in the corrugations by the outer sheath 230. In some embodiments (not shown), the outer surface of the dielectric spacer may be smooth, and the corrugations may instead be formed on an inner surface of the dielectric spacer (e.g. on a wall of the channel through which the distal portion 216 of the inner conductor 204 extends). The concept of using a corrugated dielectric material in the radiating tip to increase the flexibility of the radiating tip may be incorporated into other electrosurgical instruments. For example, electrosurgical instrument 300 may be modified so that the intermediate portion 322 of the dielectric material 308 has a corrugated surface, to provide a series of bending points for the radiating tip 312.

Figure 11A:
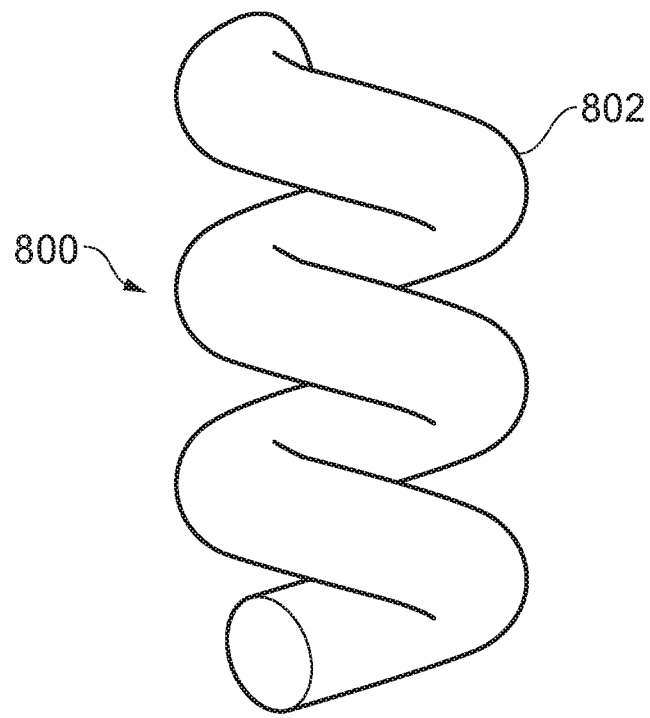
FIGS. 11a and 11b show perspective views of a dielectric spacer that may be used in an electrosurgical instrument according to an embodiment of the invention.
Figure 11B:
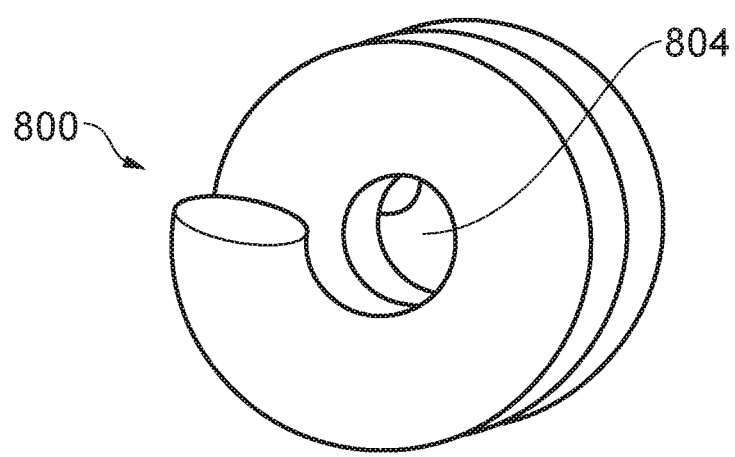

FIGS. 11a and 11b show perspective views of a dielectric spacer 800 that may be used in an electrosurgical instrument that is an embodiment of the invention. For example, dielectric spacer 800 may replace dielectric spacer 228 in electrosurgical instrument 200. Dielectric spacer 800 has a helical body 802 made of a flexible dielectric material (e.g. PTFE) that is formed into a coil. The helical body 802 defines a passageway 804 that extends along its axis, and through which an elongate conductor (e.g. the distal portion 216 of inner conductor 208) may extend. Because of its helical shape, dielectric spacer 800 may behave like a helical spring. In particular, the helical shape of the dielectric spacer 800 may facilitate bending of the dielectric spacer 800 relative to its longitudinal axis. By incorporating dielectric spacer 800 into the radiating tip of an electrosurgical instrument, bending of the radiating tip may be thus facilitated. The helical shape of the dielectric spacer may also enhance the resilience of the dielectric spacer 800. The dielectric spacer 800 may serve to straighten the radiating tip after the radiating tip has been bent. For example, after bending the radiating tip to go through a winding passageway, the resilience of the dielectric spacer 800 may act to straighten the radiating tip. In this manner, the radiating tip may automatically return to its original (e.g. straight) configuration after being bent.

In some embodiments (not shown), only a portion of the dielectric spacer may have a helical shape. The concept of using a helically shaped dielectric material in the radiating tip to facilitate bending of the radiating tip may be incorporated into other electrosurgical instruments. For example, electrosurgical instrument 300 may be modified so that the intermediate portion 322 of the dielectric material 308 includes a helical portion, to facilitate bending of the radiating tip 312.

The invention claimed is:
1. An electrosurgical instrument comprising:
a coaxial feed cable for conveying microwave energy or radiofrequency energy, the coaxial feed cable having an inner conductor, an outer conductor, and a dielectric material separating the inner conductor and the outer conductor; and
a radiating tip disposed at a distal end of the coaxial feed cable to receive the microwave energy or the radiofrequency energy, the radiating tip comprising:
an energy delivery structure configured to deliver the microwave energy or the radiofrequency energy received from the coaxial feed cable from an outer surface of the radiating tip, wherein the energy delivery structure comprises an elongate conductor electrically connected to the inner conductor and extending in a longitudinal direction beyond the distal end of the coaxial feed cable; and a dielectric body disposed around the elongate conductor of the energy delivery structure, wherein the elongate conductor extends within a channel in the dielectric body;

wherein the dielectric body comprises a cavity therein, the cavity being disposed adjacent to the channel within which the elongate conductor extends to facilitate flexure of the radiating tip, wherein the radiating tip further includes an outer sheath disposed around a radially outer surface of the dielectric body, wherein the outer sheath is separate from the dielectric body to allow relative movement between the outer sheath and the dielectric body.

2. The electrosurgical instrument according to claim 1, wherein the cavity is disposed around the elongate conductor.

3. The electrosurgical instrument according to claim 1, wherein the cavity comprises a lumen extending longitudinally in the dielectric body.

4. The electrosurgical instrument according to claim 3, wherein the dielectric body comprises an inner sleeve surrounding the elongate conductor, and wherein the lumen is spaced from the elongate conductor by a radial thickness of the inner sleeve.

5. The electrosurgical instrument according to claim 3, wherein the lumen has an annular cross-section.

6. The electrosurgical instrument according to claim 3, wherein the lumen forms a longitudinally extending groove disposed at the radially outer surface of the dielectric body.

7. The electrosurgical instrument according to claim 1, wherein the cavity is formed by an indentation in the dielectric body.

8. The electrosurgical instrument according to claim 1, wherein the dielectric body is formed of a first dielectric material, and the outer sheath is formed of a second dielectric material different from the first dielectric material.

9. The electrosurgical instrument according to claim 8, wherein the first dielectric material has a higher melting temperature than the second dielectric material.

10. The electrosurgical instrument according to claim 9, wherein the first dielectric material is polytetrafluoroethylene and the second dielectric material is a fluorinated ethylene propylene.

11. The electrosurgical instrument according to claim 1, wherein the outer sheath includes a distal tip arranged to cover a distal end of the dielectric body.

12. The electrosurgical instrument according to claim 1, wherein the outer sheath is configured to form a seal around the radially outer surface of the dielectric body.

13. The electrosurgical instrument according to claim 1, wherein:
the energy delivery structure comprises a proximal tuning element and a distal tuning element, each of which is electrically connected to the elongate conductor, the proximal tuning element and the distal tuning element being longitudinally spaced apart by a length of the elongate conductor; and
the dielectric body includes a first dielectric spacer disposed between the proximal tuning element and the distal tuning element.

14. An electrosurgical apparatus for treating biological tissue, the electrosurgical apparatus comprising:
an electrosurgical generator arranged to supply microwave energy or radiofrequency energy; and
the electrosurgical instrument according to claim 1 connected to receive the microwave energy or the radiofrequency energy from the electrosurgical generator.

15. The electrosurgical apparatus according to claim 14 further comprising a surgical scoping device that comprises a flexible insertion cord having an instrument channel, wherein the electrosurgical instrument is dimensioned to fit within the instrument channel.

16. An electrosurgical instrument comprising:
a coaxial feed cable for conveying microwave energy and/or radiofrequency energy, the coaxial feed cable having an inner conductor, an outer conductor, and a dielectric material separating the inner conductor and the outer conductor; and
a radiating tip disposed at a distal end of the coaxial feed cable to receive the microwave energy and/or the radiofrequency energy, the radiating tip comprising:
an energy delivery structure configured to deliver the microwave energy and/or the radiofrequency energy received from the coaxial feed cable from an outer surface of the radiating tip, wherein the energy delivery structure comprises an elongate conductor electrically connected to the inner conductor and extending in a longitudinal direction beyond the distal end of the coaxial feed cable; and
a dielectric body disposed around the elongate conductor of the energy delivery structure, wherein the elongate conductor extends within a channel in the dielectric body;
wherein the dielectric body comprises a cavity therein, the cavity being disposed adjacent to the channel within which the elongate conductor extends to facilitate flexure of the radiating tip;
wherein the cavity is formed by an indentation in the dielectric body, wherein the indentation forms a circumferential groove extending around the dielectric body, such that the groove forms a loop around a circumference of the dielectric body, or the groove has a helical shape such that the groove winds around the dielectric body along a length of the dielectric body.

17. An electrosurgical instrument comprising:
a coaxial feed cable for conveying microwave energy and/or radiofrequency energy, the coaxial feed cable having an inner conductor, an outer conductor, and a dielectric material separating the inner conductor and the outer conductor; and
a radiating tip disposed at a distal end of the coaxial feed cable to receive the microwave energy and/or the radiofrequency energy, the radiating tip comprising:
an energy delivery structure configured to deliver the microwave energy and/or the radiofrequency energy received from the coaxial feed cable from an outer surface of the radiating tip, wherein the energy delivery structure comprises an elongate conductor electrically connected to the inner conductor and extending in a longitudinal direction beyond the distal end of the coaxial feed cable; and
a dielectric body disposed around the elongate conductor of the energy delivery structure, wherein the elongate conductor extends within a channel in the dielectric body:
wherein the dielectric body comprises a cavity therein, the cavity being disposed adjacent to the channel within which the elongate conductor extends to facilitate flexure of the radiating tip;
wherein the cavity is formed by an indentation in the dielectric body,
wherein the dielectric body includes a corrugated surface, and wherein the indentation is formed by corrugations in the corrugated surface.

18. An electrosurgical instrument comprising:
a coaxial feed cable for conveying microwave energy and/or radiofrequency energy, the coaxial feed cable having an inner conductor, an outer conductor, and a dielectric material separating the inner conductor and the outer conductor; and
a radiating tip disposed at a distal end of the coaxial feed cable to receive the microwave energy and/or the radiofrequency energy, the radiating tip comprising:
  an energy delivery structure configured to deliver the microwave energy and/or the radiofrequency energy received from the coaxial feed cable from an outer surface of the radiating tip, wherein the energy delivery structure comprises an elongate conductor electrically connected to the inner conductor and extending in a longitudinal direction beyond the distal end of the coaxial feed cable; and
  a dielectric body disposed around the elongate conductor of the energy delivery structure, wherein the elongate conductor extends within a channel in the dielectric body;
  wherein the dielectric body comprises a cavity therein, the cavity being disposed adjacent to the channel within which the elongate conductor extends to facilitate flexure of the radiating tip;
  wherein the energy delivery structure comprises a distal electrode and a proximal electrode disposed on a surface of the dielectric body, the distal electrode and the proximal electrode being physically separated from each other by an intermediate portion of the dielectric body;
  wherein the proximal electrode is electrically connected to the outer conductor; and
  the distal electrode is electrically connected to the inner conductor via the elongate conductor.

19. The electrosurgical instrument according to claim 18, further including a tuning element mounted in the intermediate portion of the dielectric body.

* * * * *